United States Patent
Hosseini et al.

(10) Patent No.: US 12,495,323 B2
(45) Date of Patent: Dec. 9, 2025

(54) TECHNIQUES FOR CHANNEL MEASUREMENTS FOR MULTIPLE UPLINK CARRIERS IN CARRIER AGGREGATION

(71) Applicant: QUALCOMM Incorporated, San Diego, CA (US)

(72) Inventors: Seyedkianoush Hosseini, San Diego, CA (US); Jing Jiang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 621 days.

(21) Appl. No.: 17/876,335

(22) Filed: Jul. 28, 2022

(65) Prior Publication Data

US 2024/0040416 A1 Feb. 1, 2024

(51) Int. Cl.
*H04W 24/10* (2009.01)
*H04L 5/00* (2006.01)

(52) U.S. Cl.
CPC .......... *H04W 24/10* (2013.01); *H04L 5/0051* (2013.01)

(58) Field of Classification Search
CPC ... H04W 24/10; H04W 24/08; H04W 52/146; H04L 5/0051; H04L 5/001; H04L 5/0048; H04L 5/1469; H04L 1/189; H04B 7/0695; H04B 7/0408
See application file for complete search history.

(56) References Cited

U.S. PATENT DOCUMENTS

| | | | | |
|---|---|---|---|---|
| 2015/0245302 A1* | 8/2015 | Lim | ............... | H04W 52/146 455/522 |
| 2019/0238208 A1* | 8/2019 | Tang | ............... | H04B 7/0695 |
| 2020/0178333 A1* | 6/2020 | Liu | ............... | H04W 74/006 |
| 2020/0280946 A1* | 9/2020 | Guo | ............... | H04L 5/00 |
| 2020/0351950 A1* | 11/2020 | Liu | ............... | H04W 74/0833 |
| 2022/0022250 A1* | 1/2022 | Cirik | ............... | H04W 74/085 |
| 2023/0048837 A1* | 2/2023 | Park | ............... | H04B 7/0408 |
| 2023/0070564 A1* | 3/2023 | Chung | ............... | H04L 1/189 |
| 2024/0172169 A1* | 5/2024 | Yerramalli | ............... | G01S 5/0205 |

FOREIGN PATENT DOCUMENTS

| BR | 112020006380 A2 * | 9/2020 | .......... H04W 52/146 |
|---|---|---|---|
| CN | 116711406 A * | 9/2023 | ........ H04W 72/0453 |
| EP | 3723432 A1 | 10/2020 | |
| WO | WO-2014054870 A1 * | 4/2014 | .......... H04W 72/541 |

OTHER PUBLICATIONS

International Search Report and Written Opinion—PCT/US2023/069530—ISA/EPO—Oct. 19, 2023.

* cited by examiner

*Primary Examiner* — Ayaz R Sheikh
*Assistant Examiner* — Louis Samara
(74) *Attorney, Agent, or Firm* — Dalei Dong; Holland & Hart LLP

(57) ABSTRACT

Methods, systems, and devices for wireless communications are described for channel measurements for multiple uplink carriers in carrier aggregation (CA). A CA configuration may provide a first downlink carrier, a first uplink carrier, and a second uplink carrier. The second uplink carrier may be a supplemental uplink (SUL) carrier that does not have an associated downlink carrier in a same frequency band. A measurement downlink carrier may be configured and associated with the second uplink carrier, and measurements of a reference resource of the measurement downlink carrier may be used to determine transmission parameters of the second uplink carrier.

28 Claims, 23 Drawing Sheets

TECHNIQUES FOR CHANNEL MEASUREMENTS FOR MULTIPLE UPLINK CARRIERS IN CARRIER AGGREGATION

FIELD OF TECHNOLOGY

The following relates to wireless communications, including techniques for channel measurements for multiple uplink carriers in carrier aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, carrier aggregation techniques may be used, in which multiple uplink component carriers, multiple downlink component carriers, or both, may be used for communications between a UE and a network entity. Efficient techniques for managing different component carriers in carrier aggregation communications may help to enhance communications efficiency, throughput, and reliability.

SUMMARY

The described techniques relate to improved methods, systems, devices, and apparatuses that support techniques for channel measurements for multiple uplink carriers in carrier aggregation. For example, the described techniques provide for a first downlink carrier, a first uplink carrier, and a second uplink carrier to be configured according to a carrier aggregation configuration for communications between a user equipment (UE) and a network entity. In some cases, the second uplink carrier may be a supplemental uplink (SUL) carrier that does not have an associated downlink carrier in a same frequency band, and the first uplink carrier and the first downlink carrier may be configured in a same frequency band such that channel measurements associated with the first downlink carrier may be used to determine transmission parameters for the first uplink carrier based on channel reciprocity.

In some cases, a measurement downlink carrier may be configured and associated with the second uplink carrier, and measurements of a reference resource of the measurement downlink carrier may be used to determine transmission parameters of the second uplink carrier. In some cases, the measurement downlink carrier may not be used for data or control communications (e.g., physical downlink shared channel (PDSCH) or physical downlink control channel (PDCCH) communications). Further, the second uplink carrier may be used for transmission of shared channel data only (e.g., physical uplink shared channel (PUSCH) communications), and the first uplink carrier may be used for both shared channel data (e.g., PUSCH communications) and control channel information (e.g., physical uplink control channel (PUCCH) communications). In some cases, the UE may measure one or more of a synchronization signal block (SSB), tracking reference signal (TRS), channel state information reference signal (CSI-RS), or any combinations thereof, transmitted using the measurement downlink carrier.

A method for wireless communication at a user equipment (UE) is described. The method may include receiving first configuration information for a first downlink carrier for downlink communications to the UE, receiving second configuration information for at least a first uplink carrier and second uplink carrier for uplink communications from the UE, where a quantity of uplink carriers exceeds a quantity of downlink carriers, receiving an indication of a reference resource of a measurement downlink carrier that is associated with the second uplink carrier, where the measurement downlink carrier is different than the first downlink carrier, measuring one or more signals received via the reference resource of the measurement downlink carrier to determine one or more measured channel parameters associated with the second uplink carrier, and transmitting one or more uplink communications using the second uplink carrier, where one or more transmission parameters of the one or more uplink communications are based on the one or more measured channel parameters.

An apparatus for wireless communication at a UE is described. The apparatus may include a processor, memory coupled with the processor, and instructions stored in the memory. The instructions may be executable by the processor to cause the apparatus to receive first configuration information for a first downlink carrier for downlink communications to the UE, receive second configuration information for at least a first uplink carrier and second uplink carrier for uplink communications from the UE, where a quantity of uplink carriers exceeds a quantity of downlink carriers, receive an indication of a reference resource of a measurement downlink carrier that is associated with the second uplink carrier, where the measurement downlink carrier is different than the first downlink carrier, measure one or more signals received via the reference resource of the measurement downlink carrier to determine one or more measured channel parameters associated with the second uplink carrier, and transmit one or more uplink communications using the second uplink carrier, where one or more transmission parameters of the one or more uplink communications are based on the one or more measured channel parameters.

Another apparatus for wireless communication at a UE is described. The apparatus may include means for receiving first configuration information for a first downlink carrier for downlink communications to the UE, means for receiving second configuration information for at least a first uplink carrier and second uplink carrier for uplink communications from the UE, where a quantity of uplink carriers exceeds a quantity of downlink carriers, means for receiving an indication of a reference resource of a measurement downlink carrier that is associated with the second uplink carrier, where the measurement downlink carrier is different than the first downlink carrier, means for measuring one or more signals received via the reference resource of the measurement downlink carrier to determine one or more measured channel parameters associated with the second uplink carrier, and means for transmitting one or more uplink communications using the second uplink carrier, where one or more transmission parameters of the one or more uplink communications are based on the one or more measured channel parameters.

A non-transitory computer-readable medium storing code for wireless communication at a UE is described. The code may include instructions executable by a processor to receive first configuration information for a first downlink carrier for downlink communications to the UE, receive second configuration information for at least a first uplink carrier and second uplink carrier for uplink communications from the UE, where a quantity of uplink carriers exceeds a quantity of downlink carriers, receive an indication of a reference resource of a measurement downlink carrier that is associated with the second uplink carrier, where the measurement downlink carrier is different than the first downlink carrier, measure one or more signals received via the reference resource of the measurement downlink carrier to determine one or more measured channel parameters associated with the second uplink carrier, and transmit one or more uplink communications using the second uplink carrier, where one or more transmission parameters of the one or more uplink communications are based on the one or more measured channel parameters.

In some examples of the method, apparatuses, and non-transitory computer-readable medium described herein, the measuring may include operations, features, means, or instructions for measuring one of more synchronization signal block (SSB) transmissions, one or more tracking reference signal (TRS) transmissions, one or more channel state information reference signal (CSI-RS) transmissions, or any combinations thereof, that are transmitted via the reference resource using the measurement downlink carrier. In some examples of the method, apparatuses, and non-transitory computer-readable medium described herein, the first uplink carrier and the first downlink carrier are in a first frequency band, and the second uplink carrier is in a second frequency band that is different than the first frequency band. In some examples of the method, apparatuses, and non-transitory computer-readable medium described herein, the measurement downlink carrier does not carry shared channel communications or control channel communications for the UE. In some examples of the method, apparatuses, and non-transitory computer-readable medium described herein, the first downlink carrier and the measurement downlink carrier is provided from different transmission-reception points.

In some examples of the method, apparatuses, and non-transitory computer-readable medium described herein, the measuring may include operations, features, means, or instructions for measuring channel characteristics of the measurement downlink carrier based on two or more reference signals that are provided in the reference resource. Some examples of the method, apparatuses, and non-transitory computer-readable medium described herein may further include operations, features, means, or instructions for estimating a path loss associated with the second uplink carrier based on a first reference signal of the two or more reference signals and deriving a transmission configuration indicator (TCI) state or beam measurement for the second uplink carrier based on a second reference signal of the two or more reference signals. Some examples of the method, apparatuses, and non-transitory computer-readable medium described herein may further include operations, features, means, or instructions for deriving a first TCI state or beam measurement for the second uplink carrier based on a first reference signal of the two or more reference signals and deriving a second TCI state or beam measurement for the second uplink carrier based on a second reference signal of the two or more reference signals. Some examples of the method, apparatuses, and non-transitory computer-readable medium described herein may further include operations, features, means, or instructions for estimating a path loss associated with the second uplink carrier based on a third reference signal received using the first downlink carrier and deriving a TCI state or beam measurement for the second uplink carrier based on a second reference signal of the two or more reference signals.

Some examples of the method, apparatuses, and non-transitory computer-readable medium described herein may further include operations, features, means, or instructions for receiving a control signal that indicates to enable the measuring of the one or more signals received via the reference resource of the measurement downlink carrier. Some examples of the method, apparatuses, and non-transitory computer-readable medium described herein may further include operations, features, means, or instructions for transmitting a request to enable measurements on the reference resource, or a request disable measurements on the reference resource. In some examples of the method, apparatuses, and non-transitory computer-readable medium described herein, the measurement downlink carrier has a different bandwidth or a different center frequency than the second uplink carrier.

Some examples of the method, apparatuses, and non-transitory computer-readable medium described herein may further include operations, features, means, or instructions for decoding a measurement identification associated with at least a first reference signal received via the reference resource and transmitting the measurement identification to a network entity.

Some examples of the method, apparatuses, and non-transitory computer-readable medium described herein may further include operations, features, means, or instructions for deriving a TCI state or beam measurement associated with at least a first reference signal received via the reference resource and transmitting an indication of the TCI state or beam measurement and an identification associated with the first reference signal to a network entity. Some examples of the method, apparatuses, and non-transitory computer-readable medium described herein may further include operations, features, means, or instructions for receiving a set of multiple reference resources that each have an associated measurement identification and transmitting an indication of a first measurement identification associated with a first reference resource based on a set of multiple channel measurements of the set of multiple reference resources.

A method for wireless communication at a network entity is described. The method may include transmitting first configuration information to a UE for a first downlink carrier for downlink communications to the UE, transmitting second configuration information to the UE for at least a first uplink carrier and second uplink carrier for uplink communications from the UE, where a quantity of uplink carriers exceeds a quantity of downlink carriers, transmitting an indication of a reference resource of a measurement downlink carrier that is associated with the second uplink carrier, where the measurement downlink carrier is different than the first downlink carrier, and receiving one or more uplink communications via the second uplink carrier, where one or more transmission parameters of the one or more uplink communications are based on one or more measured channel parameters of one or more signals transmitted via the reference resource of the measurement downlink carrier.

An apparatus for wireless communication at a network entity is described. The apparatus may include a processor, memory coupled with the processor, and instructions stored in the memory. The instructions may be executable by the processor to cause the apparatus to transmit first configuration information to a UE for a first downlink carrier for downlink communications to the UE, transmit second configuration information to the UE for at least a first uplink carrier and second uplink carrier for uplink communications from the UE, where a quantity of uplink carriers exceeds a quantity of downlink carriers, transmit an indication of a reference resource of a measurement downlink carrier that is associated with the second uplink carrier, where the measurement downlink carrier is different than the first downlink carrier, and receive one or more uplink communications via the second uplink carrier, where one or more transmission parameters of the one or more uplink communications are based on one or more measured channel parameters of one or more signals transmitted via the reference resource of the measurement downlink carrier.

Another apparatus for wireless communication at a network entity is described. The apparatus may include means for transmitting first configuration information to a UE for a first downlink carrier for downlink communications to the UE, means for transmitting second configuration information to the UE for at least a first uplink carrier and second uplink carrier for uplink communications from the UE, where a quantity of uplink carriers exceeds a quantity of downlink carriers, means for transmitting an indication of a reference resource of a measurement downlink carrier that is associated with the second uplink carrier, where the measurement downlink carrier is different than the first downlink carrier, and means for receiving one or more uplink communications via the second uplink carrier, where one or more transmission parameters of the one or more uplink communications are based on one or more measured channel parameters of one or more signals transmitted via the reference resource of the measurement downlink carrier.

A non-transitory computer-readable medium storing code for wireless communication at a network entity is described. The code may include instructions executable by a processor to transmit first configuration information to a UE for a first downlink carrier for downlink communications to the UE, transmit second configuration information to the UE for at least a first uplink carrier and second uplink carrier for uplink communications from the UE, where a quantity of uplink carriers exceeds a quantity of downlink carriers, transmit an indication of a reference resource of a measurement downlink carrier that is associated with the second uplink carrier, where the measurement downlink carrier is different than the first downlink carrier, and receive one or more uplink communications via the second uplink carrier, where one or more transmission parameters of the one or more uplink communications are based on one or more measured channel parameters of one or more signals transmitted via the reference resource of the measurement downlink carrier.

In some examples of the method, apparatuses, and non-transitory computer-readable medium described herein, the one or more signals transmitted via the reference resource of the measurement downlink carrier include one of more SSB transmissions, one or more TRS transmissions, one or more CSI-RS transmissions, or any combinations thereof. In some examples of the method, apparatuses, and non-transitory computer-readable medium described herein, the first uplink carrier and the first downlink carrier are in a first frequency band, and the second uplink carrier is in a second frequency band that is different than the first frequency band. In some examples of the method, apparatuses, and non-transitory computer-readable medium described herein, the measurement downlink carrier does not carry shared channel communications or control channel communications for the UE. In some examples of the method, apparatuses, and non-transitory computer-readable medium described herein, the first downlink carrier and the measurement downlink carrier are provided from different transmission-reception points.

In some examples of the method, apparatuses, and non-transitory computer-readable medium described herein, a first TCI state or beam measurement for the second uplink carrier is derived based on a first reference signal of two or more reference signals transmitted via the reference resource, and a second TCI state or beam measurement for the second uplink carrier is derived based on a second reference signal of the two or more reference signals. In some examples of the method, apparatuses, and non-transitory computer-readable medium described herein, a path loss estimation associated with the second uplink carrier is based on a first reference signal transmitted using the first downlink carrier, and a TCI state or beam measurement for the second uplink carrier is derived based on a second reference signal transmitted using the measurement downlink carrier.

Some examples of the method, apparatuses, and non-transitory computer-readable medium described herein may further include operations, features, means, or instructions for transmitting a control signal to the UE that indicates to enable the measuring of the one or more signals received via the reference resource of the measurement downlink carrier. Some examples of the method, apparatuses, and non-transitory computer-readable medium described herein may further include operations, features, means, or instructions for receiving, from the UE, a request to enable measurements on the reference resource or a request disable measurements on the reference resource, and where the control signal is transmitted or not transmitted responsive to the request.

DETAILED DESCRIPTION

Figure 1:
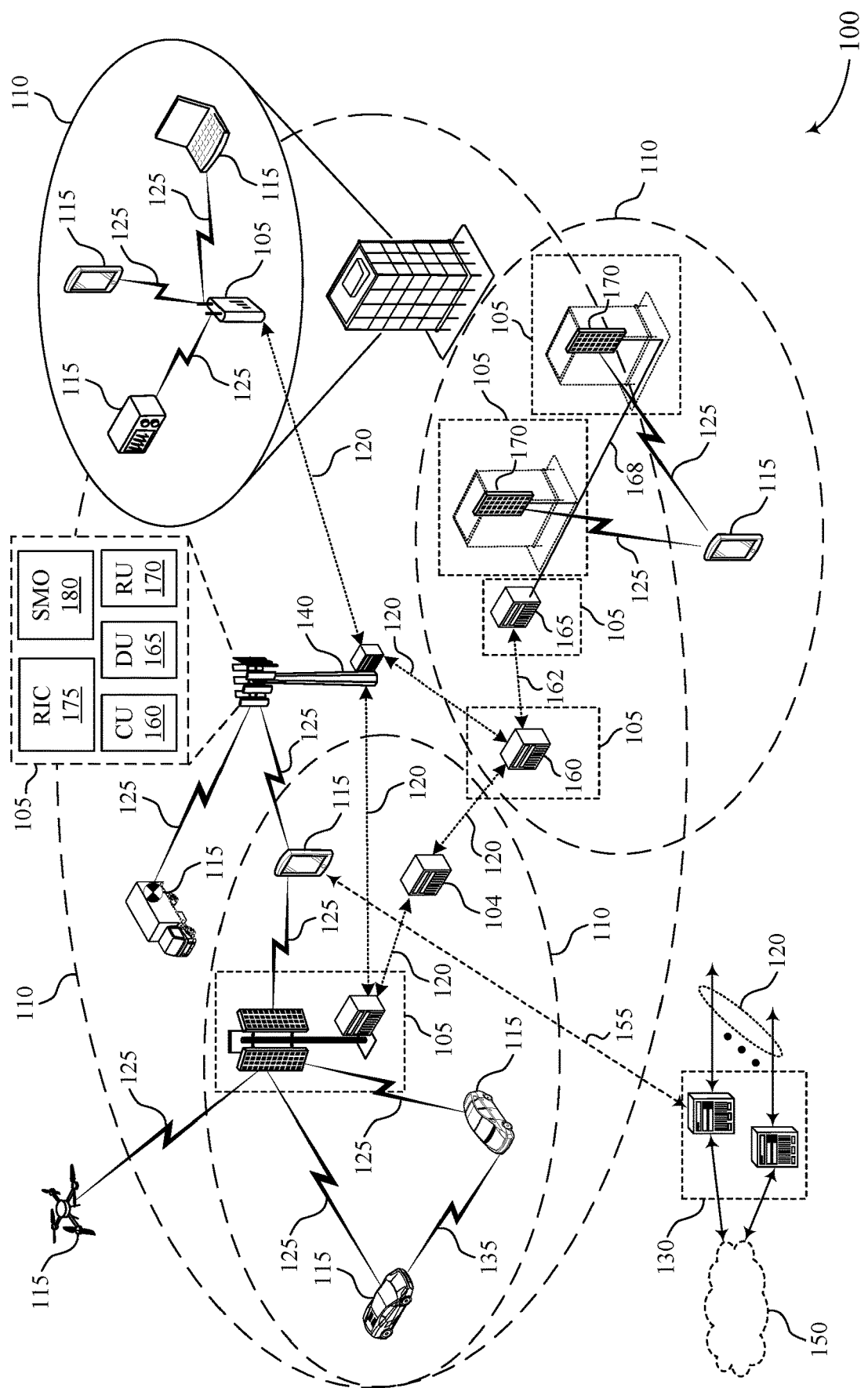
FIG. 1 illustrates an example of a wireless communications system that supports techniques for channel measurements for multiple uplink carriers in carrier aggregation in accordance with one or more aspects of the present disclosure.

In accordance with various aspects discussed herein, the described techniques provide channel measurement techniques in carrier aggregation configurations that may use a supplemental uplink (SUL) carrier in conjunction with one or more other uplink carriers and downlink carriers. A SUL carrier in carrier aggregation may refer to an uplink carrier that does not have an associated downlink carrier and is separate from another uplink carrier that does have an associated downlink carrier. The SUL carrier and the regular uplink carrier (e.g., non-SUL carrier) may be associated with a same serving cell, and in some cases a SUL carrier may be configured in a lower frequency band that non-SUL carriers. For example, a 5G system may configure non-SUL carriers in a first frequency band that is associated with 5G communications (e.g., in a 30 GHz frequency band), and may configure a SUL carrier in a second frequency band that is lower than the first frequency band (e.g., the second frequency band may be a less than 6 GHz frequency band that is shared with 4G communications). In such examples, the SUL carrier may provide enhanced uplink coverage than the higher band non-SUL carriers, and thus may allow for uplink communications with lower power consumption at the UE.

However, channel measurements used for determining transmission parameters for uplink transmissions may be based on measurements of downlink channels, and channel measurements of a downlink carrier in a different frequency band than the SUL carrier may have poor correlation to the frequency band of the SUL carrier (e.g., due to different fading characteristics at the different frequency bands). Thus, measurements of a downlink carrier in a different frequency band than the SUL may provide less accurate channel estimations for the SUL channel, which may result in less reliable communications, less efficient communications, or both, via the SUL carrier. For example, for power control, a UE may be indicated to use a reference signal on a downlink carrier for measuring path-loss. Further, an uplink transmission configuration indication (TCI) state or beam measurement may be based on downlink signals such as provided in a synchronization signal block (SSB) or channel state information reference signal (CSI-RS). In cases where the SUL carrier is in a different band than non-SUL carriers, the measurements on the downlink carrier may not be able to used directly and efficiently for determining transmission parameters (e.g., uplink transmit power, TCI state) for the SUL carrier. Additionally, measurements of a downlink carrier that is not associated with the SUL carrier result in measurements are associated with a radio head for the downlink carrier, and thus the SUL carrier would be limited to being provided through a radio head that also provides a non-SUL downlink carrier. Such constraints on a radio head that provides the SUL carrier may limit reduce scheduling flexibility and may not allow for supporting inter-cell or inter-site uplink coverage enhancements.

Various aspects of the present disclosure provide for measurements of downlink channels that are more closely related to a configured SUL carrier, which may allow for more accurate transmission parameters for the SUL carrier (e.g., a more accurate transmission configuration indication (TCI) state determination). Additionally, or alternatively, various described aspects may allow for SUL and non-SUL carriers to use different radio heads, which may enhance efficiency by allowing additional flexibility to configure a SUL carrier via a radio head that provides only a SUL carrier (e.g., a lower-band radio head that does not provide a non-SUL carrier).

In accordance with various aspects, a first uplink carrier and a first downlink carrier that are regular carriers (e.g., non-SUL carriers) may be configured at a UE, along with a second uplink carrier that is a SUL carrier. In some cases, a measurement downlink carrier may be configured and associated with the second uplink carrier. Measurements of a reference resource of the measurement downlink carrier may be used to determine transmission parameters of the second uplink carrier. In some cases, the measurement downlink carrier may not be used for data or control communications (e.g., physical downlink shared channel (PDSCH) or physical downlink control channel (PDCCH) communications). Further, in some cases the second uplink carrier may be used for transmission of any uplink communications (e.g., physical uplink shared channel (PUSCH) communications, physical uplink control channel (PUCCH) communications, random access channel (RACH) communications, etc.) or the second uplink carrier may be used for shared channel data only (e.g., PUSCH communications only), and the first uplink carrier may be used for both shared channel data (e.g., PUSCH communications) and control channel information (e.g., PUCCH communications).

In some cases, the UE may measure one or more of a synchronization signal block (SSB), tracking reference signal (TRS), channel state information reference signal (CSI-RS), or any combinations thereof, transmitted using the measurement downlink carrier. The UE may perform channel measurements on the reference resource, which may be used for uplink power control, may be reported to the network (e.g., in a TCI state indication), or both. In some cases, multiple reference signals may be configured in the reference resource, with separate reference signals used for path loss estimation and for deriving uplink TCI state or beam measurement. In some cases, multiple reference signals may be provided from different radio heads (e.g., different transmission-reception points), and may be used to derive separate TCI states and thereby enable a SUL and non-SUL that have different TCI states (e.g., for different TRPs). In some cases, the UE may receive control signaling that enables or disables measurements on the reference resource.

Various techniques as discussed herein provide enhanced procedures for channel measurements associated with SUL carriers, that may enhance communications efficiency and reliability for transmissions via a SUL carrier. Further, various techniques may allow for SUL carriers and non-SUL carriers to have different TCI states for communications via different TRPs, which may enhance coverage and scheduling flexibility for carrier aggregation configurations that use SUL carriers. Such techniques thus may provide more consistent and reliable transmissions via SUL carriers through use of suitable transmission parameters for communications using SUL carriers, which may thus enhance overall system reliability and capacity, and enhance user experience.

Aspects of the disclosure are initially described in the context of wireless communications systems. Aspects of the disclosure are further illustrated by and described with reference to SUL configurations, a process flow, apparatus diagrams, system diagrams, and flowcharts that relate to techniques for channel measurements for multiple uplink carriers in carrier aggregation.

FIG. 1 illustrates an example of a wireless communications system 100 that supports techniques for channel measurements for multiple uplink carriers in carrier aggregation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being anode. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for channel measurements for multiple uplink carriers in carrier aggregation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some cases, a UE 115 may be configured for carrier aggregation that uses one or more SUL carriers. For example, a UE 115 may be configured with a first uplink carrier and a first downlink carrier that are regular carriers (e.g., non-SUL carriers), along with a second uplink carrier that is a SUL carrier. In some cases, a measurement downlink carrier may be configured and associated with the second uplink carrier, and measurements of a reference resource of the measurement downlink carrier may be used to determine transmission parameters of the second uplink carrier. In some cases, the UE 115 may measure one or more of a SSB, TRS, CSI-RS, or any combinations thereof, transmitted using the measurement downlink carrier. The UE 115 may perform channel measurements on the reference resource, which may be used for uplink power control, may be reported to a network entity 105 (e.g., in a TCI state indication), or both. In some cases, multiple reference signals may be provided from different RUs 170, and may be used to derive separate TCI states or beam measurements and thereby enable a SUL and non-SUL that have different TCI states (e.g., for different RUs 170).

Figure 2:
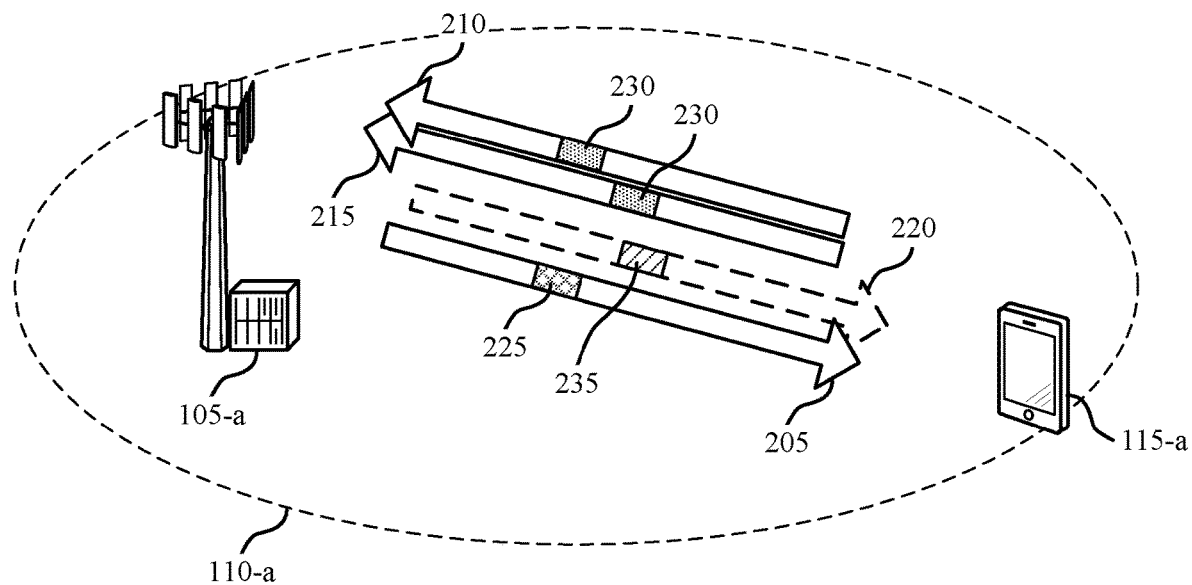
FIG. 2 illustrates an example of a wireless communications system that supports techniques for channel measurements for multiple uplink carriers in carrier aggregation in accordance with one or more aspects of the present disclosure.

FIG. 2 illustrates an example of a wireless communications system 200 that supports techniques for channel measurements for multiple uplink carriers in carrier aggregation in accordance with one or more aspects of the present disclosure. In some examples, wireless communications system 200 may implement aspects of wireless communications system 100. In this example, wireless communications system 200 includes a network entity 105-a and a UE 115-a, which may be examples of corresponding devices as discussed with respect to FIG. 1, operating in coverage area 110-a.

In this example, the network entity 105-a may provide a carrier aggregation configuration 225 to the UE 115-a that configures (e.g., in first configuration information) a first downlink carrier 205 and a first uplink carrier 210, which may be regular carriers (e.g., non-SUL carriers). Further, the carrier aggregation configuration 225 may provide (e.g., in second configuration information) information for a SUL carrier 215. In some cases, the first downlink carrier 205 and the first uplink carrier 210 may be configured in a first frequency band (e.g., in a relatively high frequency band above 6 GHz), and the SUL carrier may be configured in a second frequency band that is different than the first frequency band (e.g., in a relatively low frequency band below 6 GHz that is used for both 4G and 5G communications). In some cases, the first downlink carrier 205 and the first uplink carrier 210 may be configured in a time division duplexing (TDD) configuration in the first frequency band, and the SUL carrier 215 may be configured in a frequency division duplexing (FDD) configuration in the second frequency band. In some cases, uplink communications 230 (e.g., PUSCH, PUCCH communications) may be transmitted via the first uplink carrier 210 and the SUL carrier 215, where PUCCH communications may be provided using the first uplink carrier 210 only (e.g., the SUL carrier 215 does not transmit PUCCH), and PUSCH communications may be provided using both the first uplink carrier 210 and the SUL carrier 215. In some case, PUSCH communications may be set to be on one only or switch dynamically across the first uplink carrier 210 and the SUL carrier 215 (e.g., where concurrent PUSCH transmission on both is not supported). In some cases, the carrier aggregation configuration 225 may not provide a downlink carrier in the second frequency band.

In accordance with various aspects discussed herein, a measurement downlink carrier 220 may be configured, that includes a measurement resource 235 for channel measurements associated with the SUL carrier 215 (which may be an example of a reference resource). In some cases, the measurement downlink carrier 220 is not intended for data transmission or reception, and thus the UE 115-a does not perform the regular data reception or transmission on the measurement downlink carrier 220 (e.g., the UE 115-a does not perform PDCCH decoding, is not configured with for periodic communications on the carrier, does not transmit a scheduling request (SR) on the carrier, does not use the carrier for PUCCH transmission, and the like), and instead uses the measurement resource 235 for channel measurements associated with the SUL carrier 215. For example, the measurement resource 235 may provide resources for SSB transmissions, TRS transmissions, CSI-RS transmissions, and the like. As discussed herein, in some cases, the uplink communications 230 may be transmitted on the first uplink carrier 210 (e.g., PUCCH and PUSCH transmissions) and the SUL carrier 215 (e.g. PUSCH transmission), and in other cases the SUL carrier 215 may have no uplink communications 230 for some period of time. In cases where there is no uplink transmissions on the SUL carrier 215, accurate measurement is not needed, and in some cases aperiodic reference signals (e.g., aperiodic TRS, aperiodic CSI-RS) may be configured for transmission in the measurement resource 235. For example, a measurement reference signal on the measurement downlink carrier 220 may be triggered upon switching the UE 115-a from regular uplink (e.g. non-SUL or NUL) to SUL carrier aggregation as part of a first scheduled uplink transmission on the SUL carrier 215.

In some cases, the measurement resource 235 may provide different reference signals for different purposes. For example, a first reference signal (e.g., CSI-RS) may be used for path-loss estimation and a second reference signal (e.g., from a SSB) may be used for deriving an uplink TCI state or beam measurement. Additionally, or alternatively, the UE 115-a may be configured with different reference signals for same purpose. For example, a first reference signal (e.g., in a first SSB from a first RU) may be used for deriving a first uplink TCI state (e.g., to transmit to the first RU) and a second reference signal (e.g., in a second SSB from a second RU) may be used for deriving a second uplink TCI state (e.g., to transmit to the second RU). In some cases, the UE 115-a may use reference signals provided using the measurement resource 235 for some purposes (e.g., derivation of an uplink TCI state or beam measurement), and may use reference signals provided on the first downlink carrier 205 for other purposes (e.g., for path loss estimation). For example, if carrier frequencies of the first uplink carrier 210 and the SUL carrier 215 are relatively close or relatively closely correlated, path-loss may be estimated by performing measurements on the first downlink carrier 205. However, for deriving uplink TCI states, which may be more dependent on small scale fading, the measurements from the measurement downlink carrier 220 may be used. In some cases, performing measurements on additional carriers can incur additional power consumption for the UE 115-a, and the network entity 105-a may enable or disable measurements on the measurement downlink carrier 220 based on whether the SUL carrier 215 is being used. In some cases, measurements on the measurement downlink carrier 220 may be enabled or disabled based on signaling from the network entity 105-a, such as RRC signaling or a medium access control (MAC) control element (CE), or downlink control information (DCI) that schedules communications. In cases where measurements on the measurement downlink carrier 220 are disabled, the UE 115-a may fall back to using measurements on the first downlink carrier 205 for uplink transmissions on the SUL carrier 215.

In some cases, the UE 115-a may transmit a request for an additional measurement source (e.g., requesting to enable measurements on the measurement downlink carrier 220) or a request to disable the additional measurement source (e.g., based on considerations such as power consumption). In some cases, such requests may be transmitted to the network as an assistance information transmission. In some cases, the measurement downlink carrier 220 may be configured to be associated with the SUL carrier 215, and may have a same bandwidth or different bandwidth as the SUL carrier 215, and may or may not have a same carrier frequency. In some cases, the SUL carrier 215 and the measurement downlink carrier 220 may correspond to different bands, when a path loss is correlated between the carriers.

Figure 3:
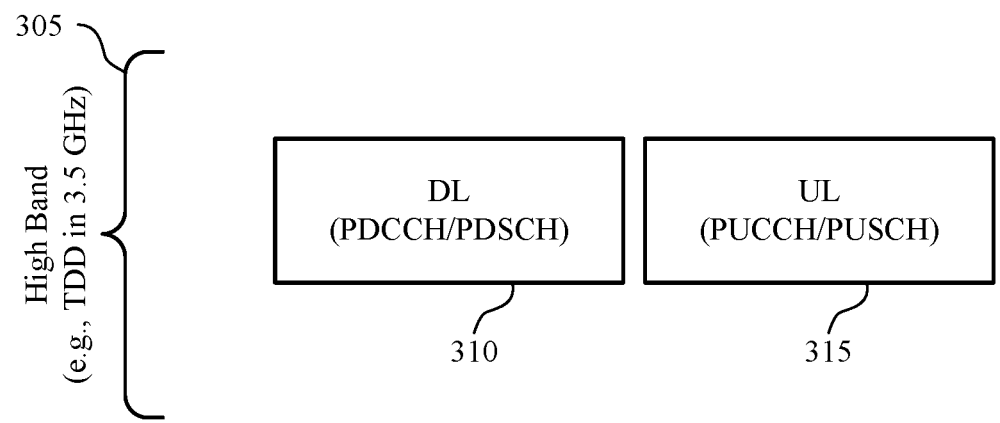
FIG. 3 illustrates an example of a carrier aggregation configuration with supplemental uplink carrier that supports techniques for channel measurements for multiple uplink carriers in carrier aggregation in accordance with one or more aspects of the present disclosure.
Figure 3:
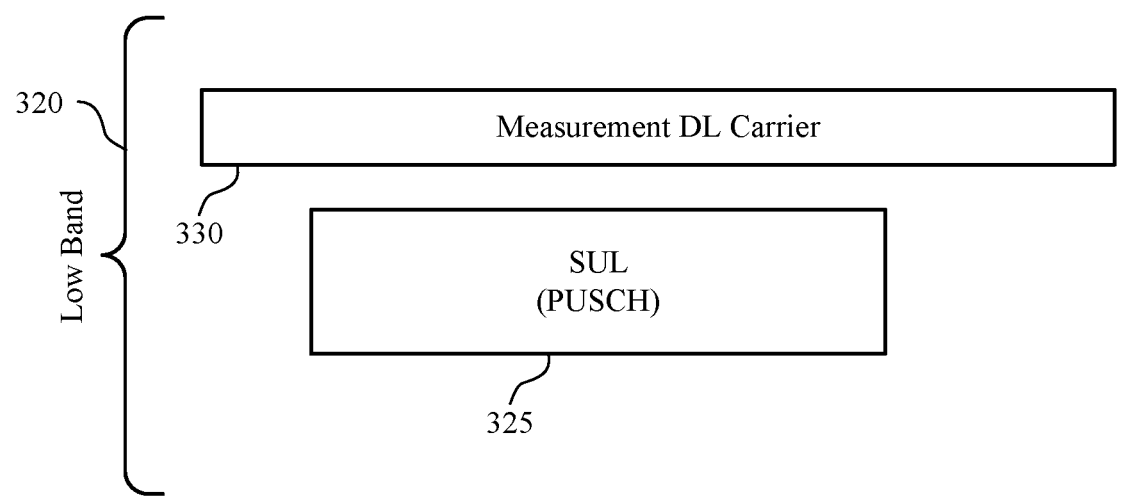

FIG. 3 illustrates an example of a carrier aggregation configuration 300 with SUL carrier that supports techniques for channel measurements for multiple uplink carriers in carrier aggregation in accordance with one or more aspects of the present disclosure. In some examples, the carrier aggregation configuration 300 with SUL carrier may implement aspects of wireless communications system 100 or 200.

In this example, a first frequency band 305 (e.g., a high band that provides TDD communications in a 3.5 GHz frequency band) may provide a first downlink carrier 310 and a first uplink carrier 315, which may be regular (e.g. non-SUL) carriers. Further, a second frequency band 320 (e.g., a low band that provides FDD communications in a 1.7-2.5 GHz frequency band) may provide a SUL carrier 325. In this example, a measurement downlink carrier 330 may be configured in the second frequency band 320, which may provide one or more reference resources for channel measurements associated with the SUL carrier 325 in accordance with techniques provided herein.

In some cases, a UE (e.g., a UE 115 as discussed herein) may be configured for carrier aggregation that uses the first downlink carrier 310 for PDCCH and PDSCH communications, and that uses the first uplink carrier 315 for PUCCH and PUSCH communications. The carrier aggregation configuration may provide SUL carrier 325 that may be used for uplink communications (e.g., PUSCH communications, PUCCH communications, or both). In other cases, multiple SUL carriers 325 may be provided, and the number of uplink carriers may be greater than the number of downlink carriers. In some cases, the measurement downlink carrier 330 may be configured and associated with the SUL carrier 325. In some cases, measurement downlink carrier 330 may be associated with only SUL carriers 325, may be associated with multiple SUL carriers 325 in a same band, or may be associated with multiple SUL carriers 325 within or across bands. In some cases, such as illustrated in FIG. 3, the measurement downlink carrier 330 may have a different bandwidth and different carrier frequency than the SUL carrier 325, but in other cases may have a same bandwidth, a same frequency, or both. In some cases, the measurement downlink carrier 330 may be in a different frequency band (e.g., in the first frequency band 305) that has reliable correlation with the second frequency band 320.

As discussed herein, in some cases, different reference resources may be configured in one or more measurement downlink carriers 330 that may be used for different purposes, such as a first reference signal for uplink TCI state derivation, and a second reference signal for path loss estimation. In some cases, the UE configured for carrier aggregation as illustrated in FIG. 3 may measure one or more of a SSB, TRS, CSI-RS, or any combinations thereof, transmitted using the measurement downlink carrier 330. The channel measurements may be used for determining uplink transmission parameters of the SUL carrier 325, such as, for example, uplink power control or determination of one or more uplink TCI states or beam measurements. Channel measurements or related information, in some cases, may be reported to a network entity (e.g., in a TCI state indication), or used at the UE for uplink power control, or both. As discussed herein, the SUL carrier 325 operating in the second frequency band 320 may provide communications having a different coverage area than that of the first uplink carrier 315 and the first downlink carrier 310, and in some cases may use a different RU. Some examples of different coverage areas and different RUs that may be used for communications are discussed with reference to FIGS. 4 and 5.

Figure 4:
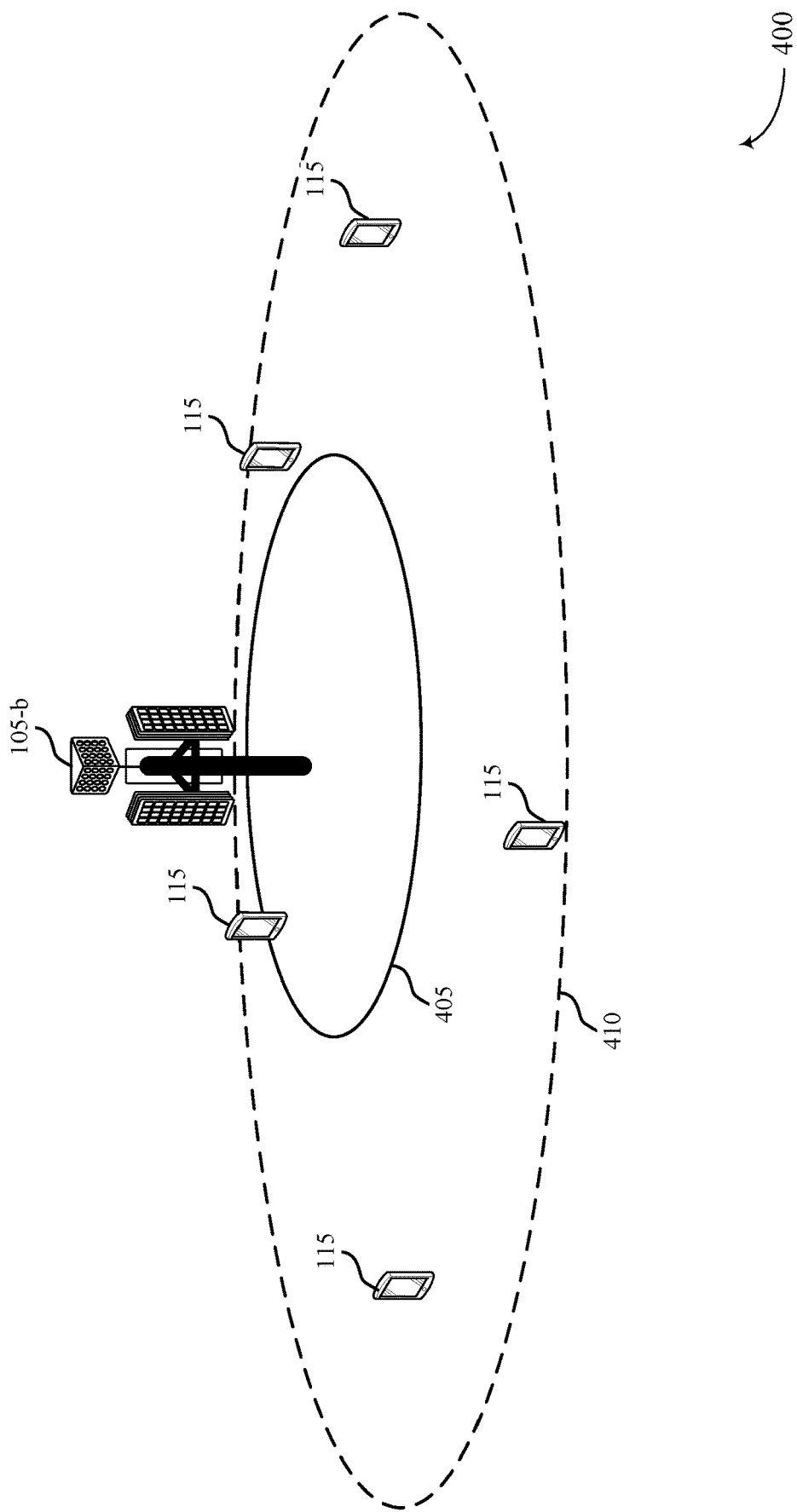
FIG. 4 illustrates an example of a wireless communications system with high and low band carrier aggregation that supports techniques for channel measurements for multiple uplink carriers in carrier aggregation in accordance with one or more aspects of the present disclosure.

FIG. 4 illustrates an example of a wireless communications system 400 with high and low band carrier aggregation that supports techniques for channel measurements for multiple uplink carriers in carrier aggregation in accordance with one or more aspects of the present disclosure. In some examples, wireless communications system 400 with high and low band carrier aggregation may implement aspects of wireless communications systems 100 or 200. In this example, wireless communications system 400 with high and low band carrier aggregation includes a network entity 105-b and multiple UEs 115, which may be examples of corresponding devices as discussed with respect to FIGS. 1 through 3.

In this example, the network entity 105-b may configure one or more UEs 115 for carrier aggregation, in which a first uplink carrier and first downlink carrier may be non-SUL carriers of a first radio access technology (e.g., a 6G network) operating in a higher frequency band in a first coverage area 405. Further, one or more UEs 115 may be configured with a SUL carrier of a second radio access technology (e.g., a 5G network) operating in a lower frequency band that may be associated with a second coverage area 410 that is larger than the first coverage area 405. In some cases, the first downlink carrier and first uplink carrier may provide data and control communications as relatively high data rates, and the lower frequency band for the SUL carrier may allow UEs 115 to transmit uplink communications with enhanced reliability based on sufficient coverage for uplink transmissions, which in some cases may allow UEs 115 to use a lower transmit power, and may thus provide power savings sufficient to overcome additional power consumption associated with performing measurements on a downlink measurement carrier. In some cases, for the measurement downlink carrier, a transmitter, such as network entity 105-b, may transmit a reference signal identification (ID) that may be detected by a UE 115 based on a search or based on network configuration from another carrier (in a configured downlink carrier). In some cases, the network entity 105-b may configure one or multiple cells in a lower frequency band that transmit using a configured reference resource, and UEs 115 may identify a cell based on measurements (e.g., RSRP) that has relatively good channel conditions, and provide an indication of the reference signal ID to the network entity 105-b. Measurements associated with the identified reference signal ID may, in some cases, be enabled or disabled for the UEs based on SUL carrier usage.

Figure 5:
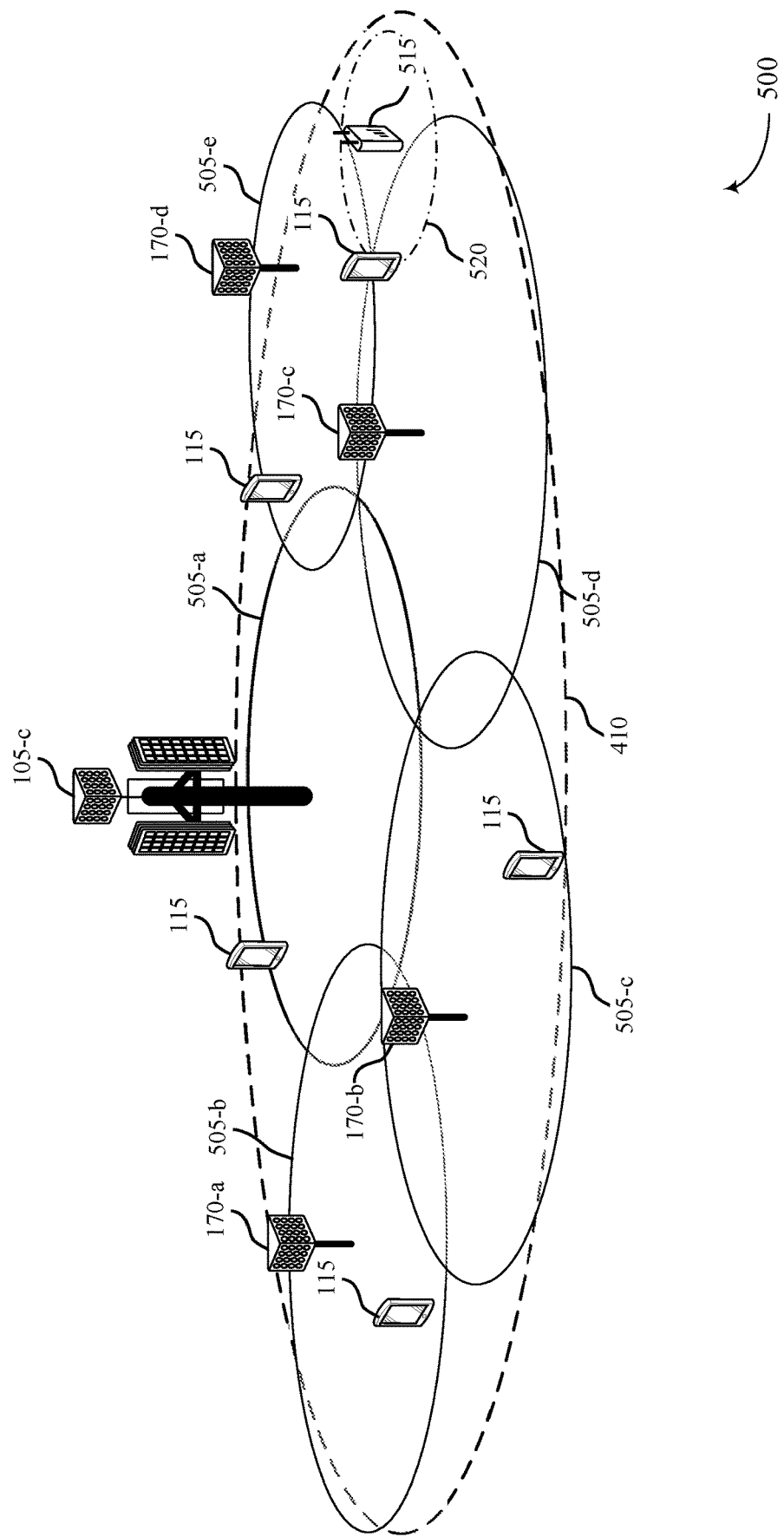
FIG. 5 illustrates an example of a wireless communications system with high and low band carrier aggregation that supports techniques for channel measurements for multiple uplink carriers in carrier aggregation in accordance with one or more aspects of the present disclosure.

FIG. 5 illustrates an example of a wireless communications system 500 with high and low band carrier aggregation that supports techniques for channel measurements for multiple uplink carriers in carrier aggregation in accordance with one or more aspects of the present disclosure. In some examples, wireless communications system 500 with high and low band carrier aggregation may implement aspects of wireless communications systems 100 or 200. In this example, wireless communications system 500 with high and low band carrier aggregation includes a network entity 105-c, multiple RUs 170, and multiple UEs 115, which may be examples of corresponding devices as discussed with respect to FIGS. 1 through 4.

In this example, The network entity 105-c may configure one or more UEs 115 for carrier aggregation, in which a non-SUL carriers (e.g., non-SUL uplink and downlink carriers) of a first radio access technology (e.g., a 6G network) may be served using a higher frequency band in coverage areas 505 provided by an associated RU 170. For example, a RU associated with network entity 105-c may provide high band communications in a first coverage area 505-a, and RUs 170-a through 170-d may provide high band communications in second through fifth coverage areas 505-b through 505-e. In some cases, one or more UEs 115 may be configured with a SUL carrier of a second radio access technology (e.g., a 5G network) operating in a lower frequency band that may be associated with a second coverage area 510 that is larger than the coverage areas 505. Further, in some examples, a smart repeater 515 (e.g., a 6G smart repeater) may provide repeated communications for third coverage area 520, and channel measurements for a SUL carrier provided through smart repeater 515 may be used on repeated signals of configured reference resources.

In some cases, the lower frequency band for the SUL carrier may allow UEs 115 to transmit uplink communications with reliable coverage for uplink transmissions, which in some cases may result in uplink communications using a lower transmit power, and may thus provide power savings sufficient to overcome additional power consumption associated with performing measurements on a downlink. In some cases, one or more UEs 115 may be configured with one or multiple cell IDs or SSB IDs for high band RUs 170, and the UE 115 may select one based on channel measurements (e.g., based on a measurement associated with a best path loss, etc.). In some cases, the higher band communications may provide downlink communications only, and uplink data transmissions may be provided using a SUL carrier in the lower band (e.g., with high band uplink carriers providing control information such as PUCCH and sounding reference signal (SRS) transmissions). In such cases, a measurement downlink carrier may be configured for channel measurements associated with the lower band communications, which may be used to determine transmission parameters for the uplink communications on the SUL carrier. Further, one or more UEs may be configured with a single or multiple cell IDs (or SSB IDs) in the higher band for searching, and measurement reports may be provided via the lower band for beam management purposes based on associated IDs provided with the measurement reports. For example, a UE may be connected to a low band cell that may have a larger coverage area than a high band cell, thus multiple high band cells may be present in the coverage area of a low band cell. In some cases, the low band cell, either explicitly or implicitly (e.g., using the mapping of the low band cell/SSB ID), may indicate a set of cell/SSB IDs to the UE that may be searched and potentially support a connection. Further, in some cases one or more reports (e.g., measurement reports, HARQ feedback, etc.) may be sent on the low band carrier. In some examples, higher band cells may be configured for uplink transmissions that do not carry uplink data (e.g., the uplink on a higher band cell may provide SRS, PUCCH, or any combinations thereof). In some cases, additionally or alternatively, multiple reference signals may be provided from different RUs 170 in a reference resource, and may be used to derive separate TCI states and thereby enable a SUL and non-SUL that have different TCI states (e.g., for different RUs 170).

As discussed herein, in some aspects a network entity may configure one or multiple cells in a lower band that may be used by a UE 115 to hypothesize to achieve the suitable cell selection. In some cases, multiple options may be available for selecting the downlink cell and associated measurement downlink carrier. One option may be for the network entity to select and configure the measurement downlink carrier, and another option may be for the network entity to provide a list of downlink cells (e.g., by providing their cell IDs or SSB IDs) for the UE 115 to measure and select (e.g., a cell with a best measured pathloss/RSRP.) In some cases, for the measurement downlink carrier, a transmitter (e.g., as network entity 105) may transmit a reference signal ID that may be detected by a UE 115 based on a search or based on network configuration from another carrier (in a configured downlink carrier). In some cases, multiple options may be available for selecting a reference signal (e.g., SSB or any other RS that could be used for measurement) on the selected downlink cell. One option may provide that the network configures a specific reference signal and transmits an indication to the UE 115, and another option may be for the network entity to provide a list of reference signals (e.g., a reference signal type and ID), and the UE 115 may select one (e.g., based on associated measurements).

Figure 6:
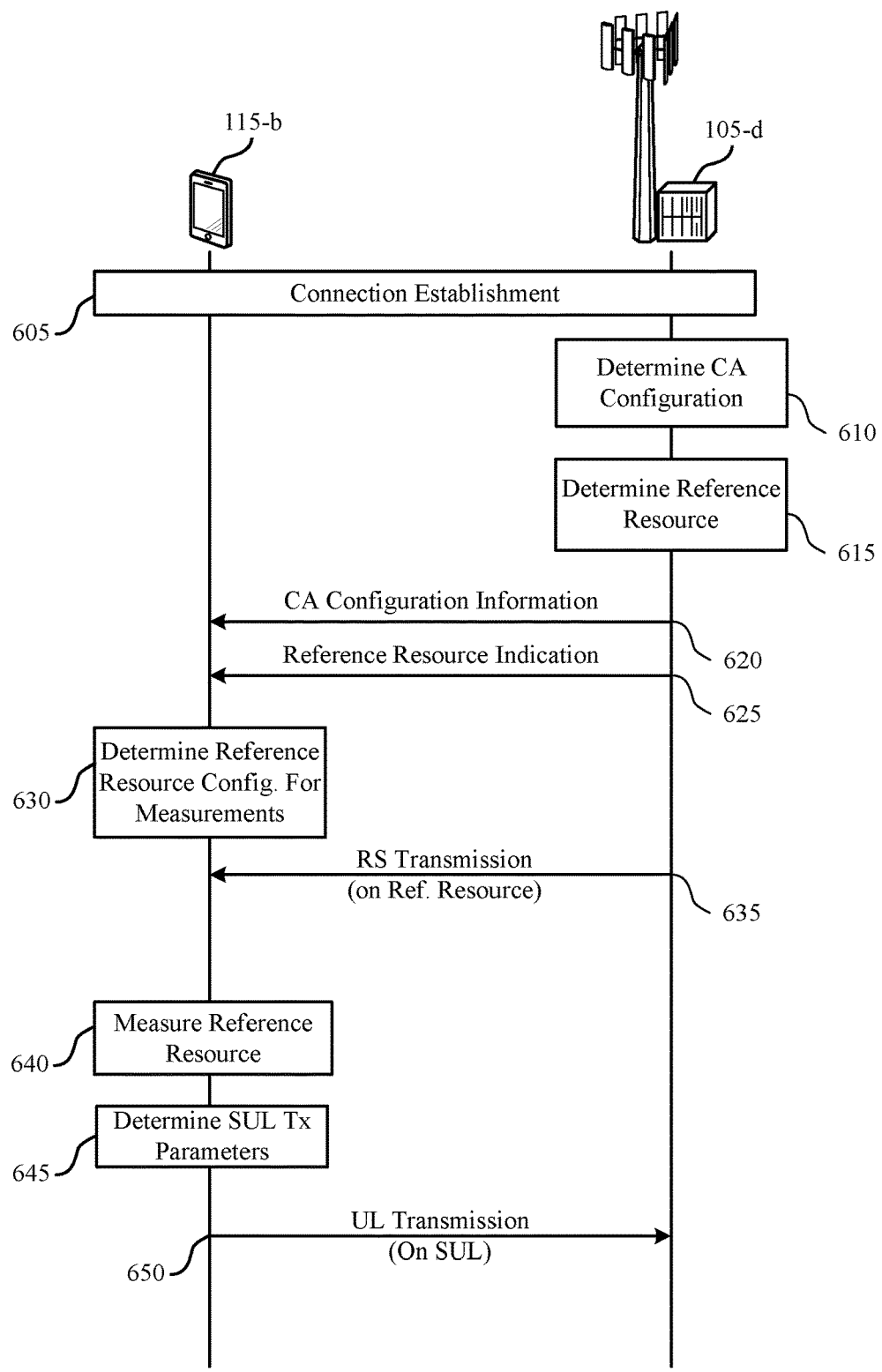
FIG. 6 illustrates an example of a process flow that supports techniques for channel measurements for multiple uplink carriers in carrier aggregation in accordance with one or more aspects of the present disclosure.

FIG. 6 illustrates an example of a process flow 600 that supports techniques for channel measurements for multiple uplink carriers in carrier aggregation in accordance with one or more aspects of the present disclosure. In some examples, process flow 600 may implement aspects of wireless communications system 100, 200, 400, or 500. The process flow 600 may include a network entity 105-*d* and a UE 115-*b*, which may be examples of the corresponding devices described with reference to FIGS. 1 through 5. The network entity 105-*d* may provide a carrier aggregation configuration and UE 115-*b* may perform channel measurements on a downlink measurement carrier, as discussed herein. Alternative examples of the following may be implemented, where some steps are performed in a different order than described or are not performed at all. In some cases, operations may include additional features not mentioned below, or further operations may be added.

At 605, UE 115-*b* and network entity 105-*d* may establish a connection. The connection may be established according to established techniques, such as RRC connection establishment techniques. The network entity 105-*d*, at 610, may determine a carrier aggregation configuration for the UE 115-*b*. In some cases, as discussed herein, the carrier aggregation configuration may include one or more SUL carriers that are configured, and that do not have an associated downlink carrier.

At 615, the network entity 105-*d* may determine a reference resource associated with the one or more SUL carriers. In some cases, the network entity 105-*d* may configure a measurement downlink carrier with the reference resource, which may provide one or more reference signals such as a CSI-RS, TRS, or an SSB, that are transmitted from one or multiple radio heads. At 620, the network entity 105-*d* may transmit carrier aggregation configuration to the UE 115-*b*. The carrier aggregation configuration, as discussed herein, may include first configuration information for a first uplink carrier and a first downlink carrier that may operate in a first frequency band, and may include second configuration information for a second uplink carrier (e.g. a SUL carrier) that may operate in a second frequency band. At 625, the network entity may transmit a reference resource indication to the UE 115-*b*. In some cases, the reference resource indication may provide information for a measurement downlink carrier and one or more associated reference resources.

At 630, the UE 115-*b* may determine a reference resource configuration for downlink measurements associated with the second uplink carrier. In some cases, the UE 115-*b* may identify one or more reference signals that are to be measured, where the measurements may be used to determine one or more transmission parameters associated with the second uplink carrier. As discussed herein, in some cases the downlink measurements may be for a CSI-RS, TRS, SSB, or other reference signal that may be used to provide a channel estimation associated with the second uplink carrier. At 635, the network entity 105-*d* may transmit one or more reference signal transmissions on the configured reference resource. In some cases, the reference signal transmissions may come from a radio head that is separate from the network entity 105-*d*. In other cases, multiple reference signal transmissions may be provided from multiple radio heads, which may be used to derive an uplink TCI state for the associated radio head, which may be different than a TCI state used for the first uplink carrier or the first downlink carrier (e.g., to provide different TRPs for the second uplink carrier and the first uplink and downlink carriers).

At 640, the UE 115-*b* may perform one or more measurements on the reference resource. In some cases, the UE 115-*b* may measure one or more CSI-RSs, TRSs, SSBs, or any combinations thereof, that are provided using the reference resource. At 645, the UE 115-*b* may determine one or more parameters associated with the second uplink carrier (e.g., SUL carrier). In some cases, the UE may determine one or more uplink power control parameters. In some cases, the UE may derive an uplink TCI state based on measurements on the reference resource. At 650, the UE 115-b may transmit an uplink transmission using the second uplink carrier. The uplink transmission may be transmitted using one or more transmission parameters that are determined based on the measurements of the reference resource, as discussed herein.

Figure 7:
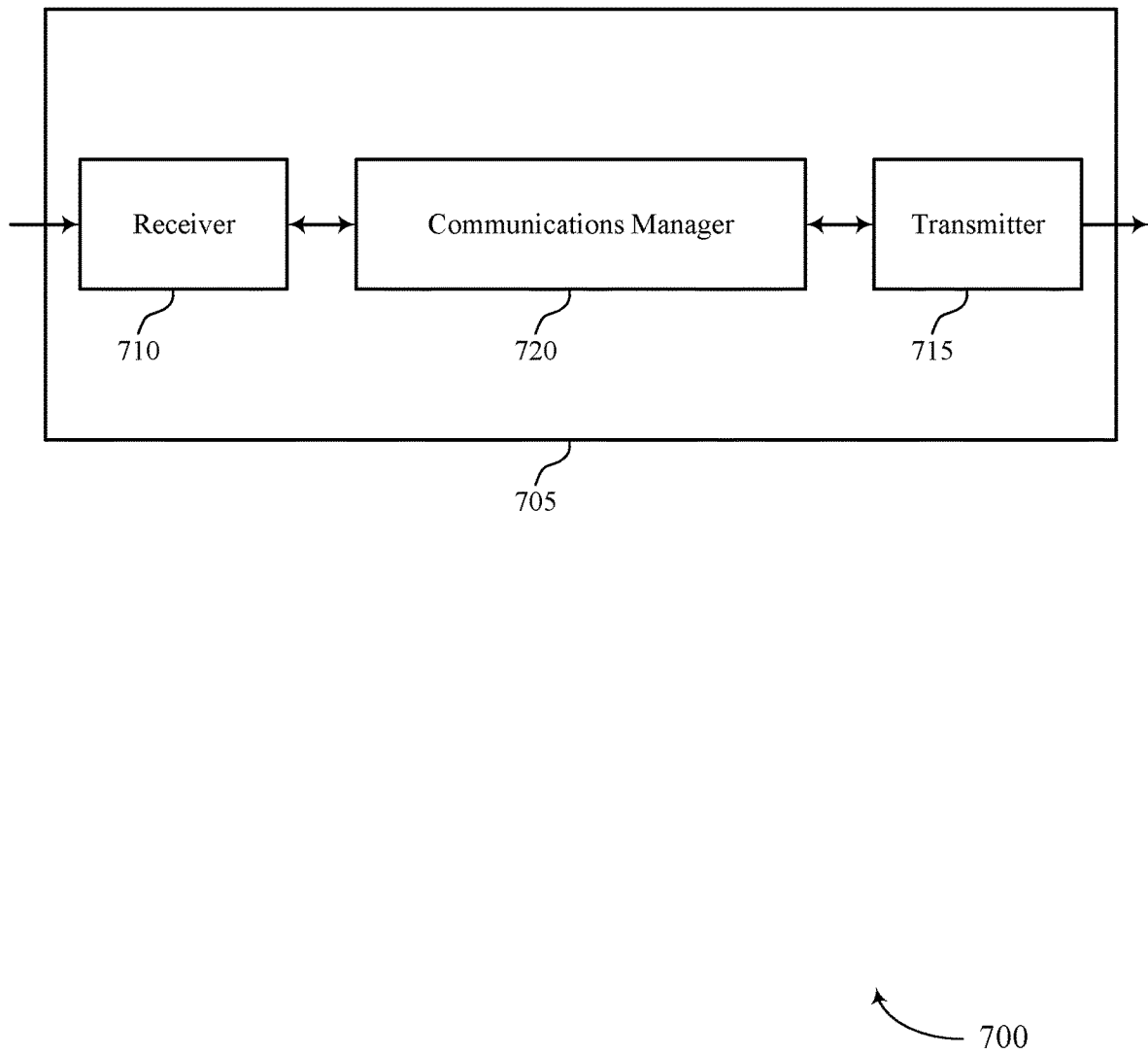
FIGS. 7 and 8 show block diagrams of devices that support techniques for channel measurements for multiple uplink carriers in carrier aggregation in accordance with one or more aspects of the present disclosure.

FIG. 7 shows a block diagram 700 of a device 705 that supports techniques for channel measurements for multiple uplink carriers in carrier aggregation in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for channel measurements for multiple uplink carriers in carrier aggregation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for channel measurements for multiple uplink carriers in carrier aggregation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for channel measurements for multiple uplink carriers in carrier aggregation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for receiving first configuration information for a first downlink carrier for downlink communications to the UE. The communications manager 720 may be configured as or otherwise support a means for receiving second configuration information for at least a first uplink carrier and second uplink carrier for uplink communications from the UE, where a quantity of uplink carriers exceeds a quantity of downlink carriers. The communications manager 720 may be configured as or otherwise support a means for receiving an indication of a reference resource of a measurement downlink carrier that is associated with the second uplink carrier, where the first uplink carrier and the second uplink carrier are associated with a same serving cell and the measurement downlink carrier is different than the first downlink carrier. The communications manager 720 may be configured as or otherwise support a means for measuring one or more signals received via the reference resource of the measurement downlink carrier to determine one or more measured channel parameters associated with the second uplink carrier. The communications manager 720 may be configured as or otherwise support a means for transmitting one or more uplink communications using the second uplink carrier, where one or more transmission parameters of the one or more uplink communications are based on the one or more measured channel parameters.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for channel measurements associated with SUL carriers, that may enhance communications efficiency and reliability for transmissions via a SUL carrier. Further, described techniques may allow for SUL carriers and non-SUL carriers to have different TCI states for communications via different TRPs, which may enhance coverage and scheduling flexibility for carrier aggregation configurations that use SUL carriers. Such techniques thus may provide more consistent and reliable transmissions via SUL carriers through use of suitable transmission parameters for communications using SUL carriers, which may thus enhance overall system reliability and capacity, and enhance user experience.

Figure 8:
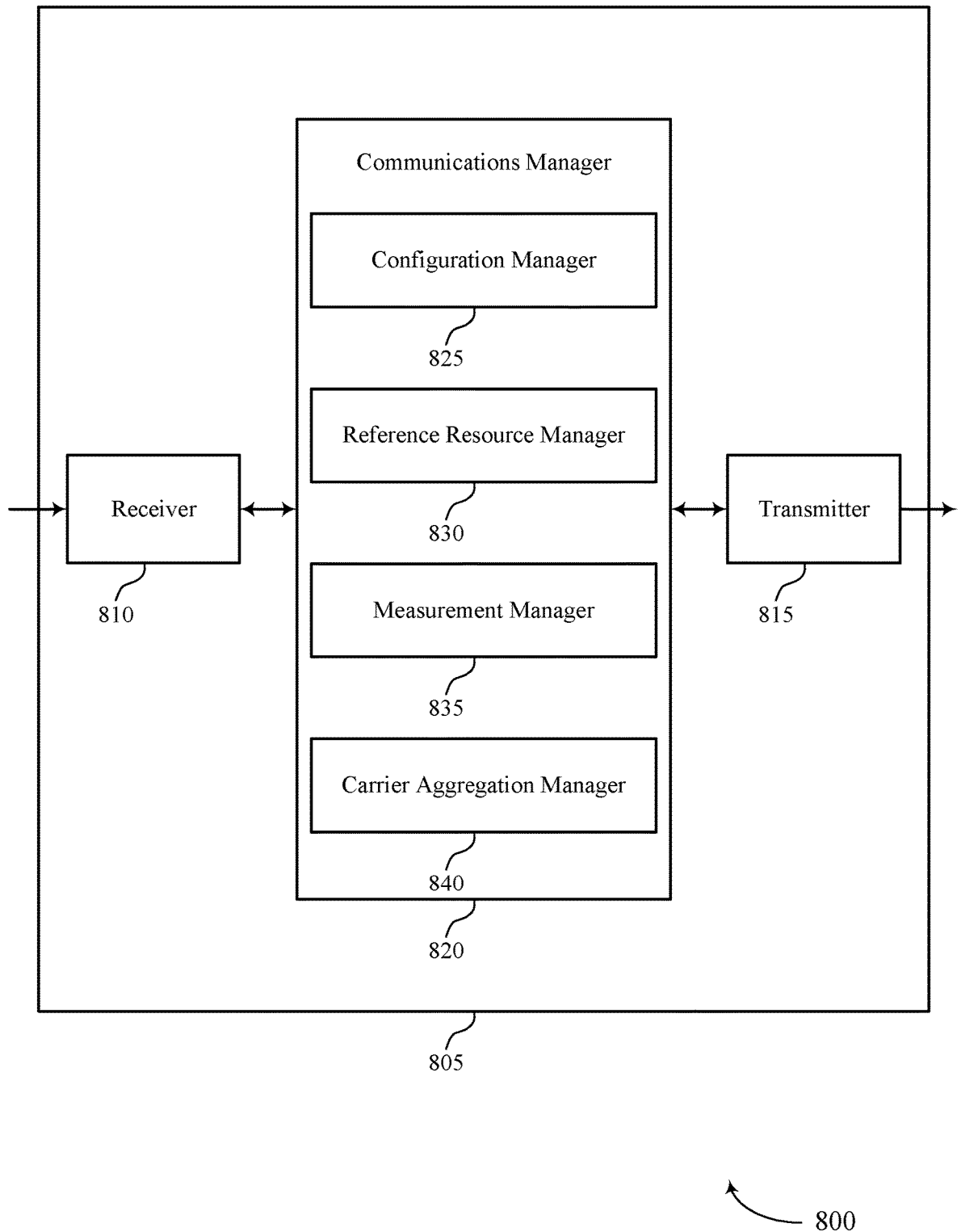

FIG. 8 shows a block diagram 800 of a device 805 that supports techniques for channel measurements for multiple uplink carriers in carrier aggregation in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for channel measurements for multiple uplink carriers in carrier aggregation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for channel measurements for multiple uplink carriers in carrier aggregation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for channel measurements for multiple uplink carriers in carrier aggregation as described herein. For example, the communications manager 820 may include a configuration manager 825, a reference resource manager 830, a measurement manager 835, a carrier aggregation manager 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The configuration manager 825 may be configured as or otherwise support a means for receiving first configuration information for a first downlink carrier for downlink communications to the UE. The configuration manager 825 may be configured as or otherwise support a means for receiving second configuration information for at least a first uplink carrier and second uplink carrier for uplink communications from the UE, where a quantity of uplink carriers exceeds a quantity of downlink carriers. The reference resource manager 830 may be configured as or otherwise support a means for receiving an indication of a reference resource of a measurement downlink carrier that is associated with the second uplink carrier, where the first uplink carrier and the second uplink carrier are associated with a same serving cell and the measurement downlink carrier is different than the first downlink carrier. The measurement manager 835 may be configured as or otherwise support a means for measuring one or more signals received via the reference resource of the measurement downlink carrier to determine one or more measured channel parameters associated with the second uplink carrier. The carrier aggregation manager 840 may be configured as or otherwise support a means for transmitting one or more uplink communications using the second uplink carrier, where one or more transmission parameters of the one or more uplink communications are based on the one or more measured channel parameters.

Figure 9:
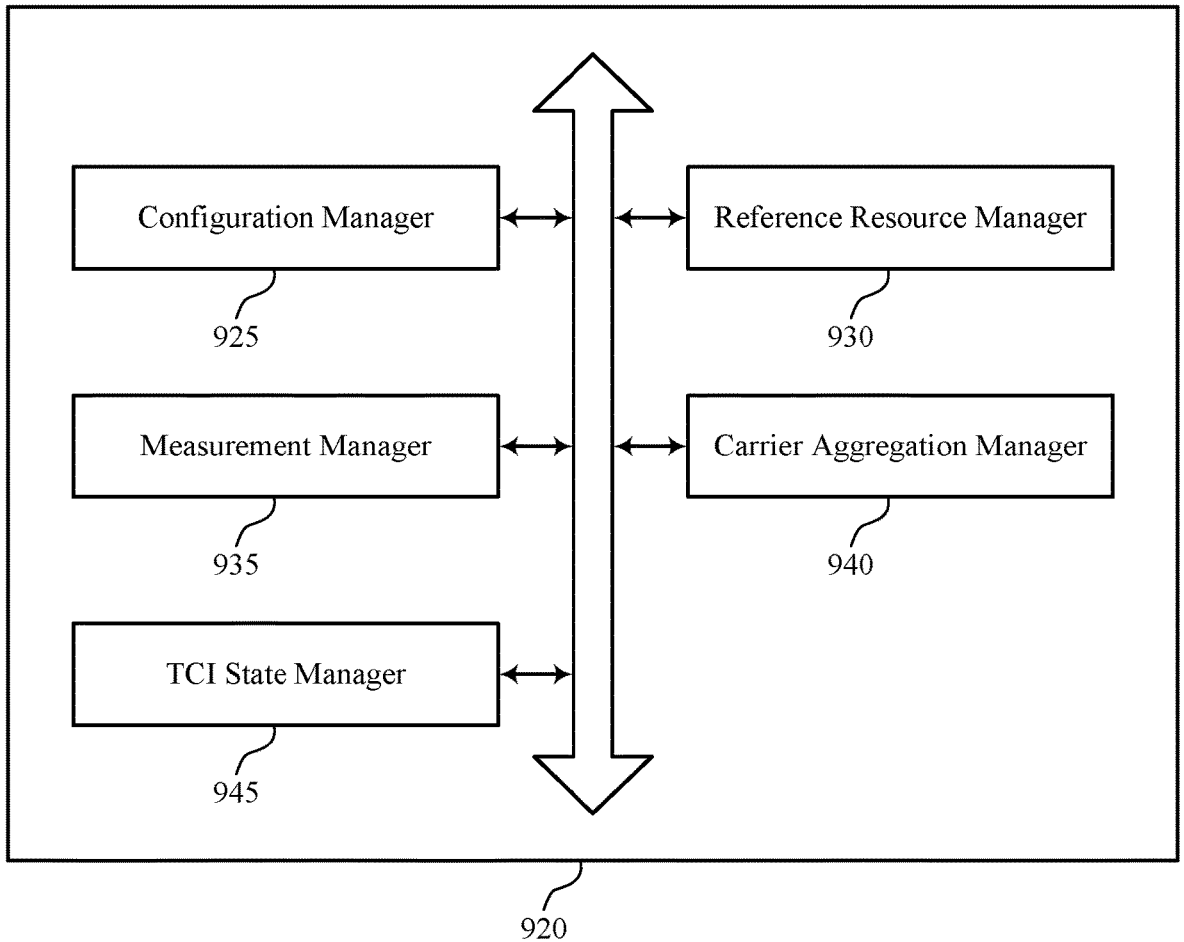
FIG. 9 shows a block diagram of a communications manager that supports techniques for channel measurements for multiple uplink carriers in carrier aggregation in accordance with one or more aspects of the present disclosure.

FIG. 9 shows a block diagram 900 of a communications manager 920 that supports techniques for channel measurements for multiple uplink carriers in carrier aggregation in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for channel measurements for multiple uplink carriers in carrier aggregation as described herein. For example, the communications manager 920 may include a configuration manager 925, a reference resource manager 930, a measurement manager 935, a carrier aggregation manager 940, a TCI state manager 945, or any combination thereof. Each of these components may communicate, directly or indirectly, with one another (e.g., via one or more buses).

The communications manager 920 may support wireless communication at a UE in accordance with examples as disclosed herein. The configuration manager 925 may be configured as or otherwise support a means for receiving first configuration information for a first downlink carrier for downlink communications to the UE. In some examples, the configuration manager 925 may be configured as or otherwise support a means for receiving second configuration information for at least a first uplink carrier and second uplink carrier for uplink communications from the UE, where a quantity of uplink carriers exceeds a quantity of downlink carriers. The reference resource manager 930 may be configured as or otherwise support a means for receiving an indication of a reference resource of a measurement downlink carrier that is associated with the second uplink carrier, where the first uplink carrier and the second uplink carrier are associated with a same serving cell and the measurement downlink carrier is different than the first downlink carrier. The measurement manager 935 may be configured as or otherwise support a means for measuring one or more signals received via the reference resource of the measurement downlink carrier to determine one or more measured channel parameters associated with the second uplink carrier. The carrier aggregation manager 940 may be configured as or otherwise support a means for transmitting one or more uplink communications using the second uplink carrier, where one or more transmission parameters of the one or more uplink communications are based on the one or more measured channel parameters.

In some examples, to support measuring, the measurement manager 935 may be configured as or otherwise support a means for measuring one of more SSB transmissions, one or more TRS transmissions, one or more CSI-RS transmissions, or any combinations thereof, that are transmitted via the reference resource using the measurement downlink carrier. In some examples, the first uplink carrier and the first downlink carrier are in a first frequency band, and the second uplink carrier is in a second frequency band that is different than the first frequency band. In some examples, the measurement downlink carrier does not carry shared channel communications or control channel communications for the UE. In some examples, the first downlink carrier and the measurement downlink carrier are provided from different transmission-reception points (e.g., different radio heads or RUs). In some examples, to support measuring, the measurement manager 935 may be configured as or otherwise support a means for measuring channel characteristics of the measurement downlink carrier based on two or more reference signals that are provided in the reference resource.

In some examples, the TCI state manager 945 may be configured as or otherwise support a means for estimating a path loss associated with the second uplink carrier based on a first reference signal of the two or more reference signals. In some examples, the TCI state manager 945 may be configured as or otherwise support a means for deriving a TCI state or beam measurement for the second uplink carrier based on a second reference signal of the two or more reference signals. In some examples, the TCI state manager 945 may be configured as or otherwise support a means for deriving a first TCI state or beam measurement for the second uplink carrier based on a first reference signal of the two or more reference signals. In some examples, the TCI state manager 945 may be configured as or otherwise support a means for deriving a second TCI state or beam measurement for the second uplink carrier based on a second reference signal of the two or more reference signals. In some examples, the TCI state manager 945 may be configured as or otherwise support a means for estimating a path loss associated with the second uplink carrier based on a third reference signal received using the first downlink carrier. In some examples, the TCI state manager 945 may be configured as or otherwise support a means for deriving a TCI state or beam measurement for the second uplink carrier based on a second reference signal of the two or more reference signals.

In some examples, the configuration manager 925 may be configured as or otherwise support a means for receiving a control signal that indicates to enable the measuring of the one or more signals received via the reference resource of the measurement downlink carrier. In some examples, the configuration manager 925 may be configured as or otherwise support a means for transmitting a request to enable measurements on the reference resource. In some examples, the measurement downlink carrier has a different bandwidth or a different center frequency than the second uplink carrier. In some examples, the measurement manager 935 may be configured as or otherwise support a means for decoding a measurement identification associated with at least a first reference signal received via the reference resource. In some examples, the measurement manager 935 may be configured as or otherwise support a means for transmitting the measurement identification to a network entity.

In some examples, the TCI state manager 945 may be configured as or otherwise support a means for deriving a TCI state or beam measurement associated with at least a first reference signal received via the reference resources. In some examples, the TCI state manager 945 may be configured as or otherwise support a means for transmitting an indication of the TCI state or beam measurement and an identification associated with the first reference signal to a network entity. In some examples, the reference resource manager 930 may be configured as or otherwise support a means for receiving a set of multiple reference resources that each have an associated measurement identification. In some examples, the reference resource manager 930 may be configured as or otherwise support a means for transmitting an indication of a first measurement identification associated with a first reference resource based on a set of multiple channel measurements of the set of multiple reference resources.

Figure 10:
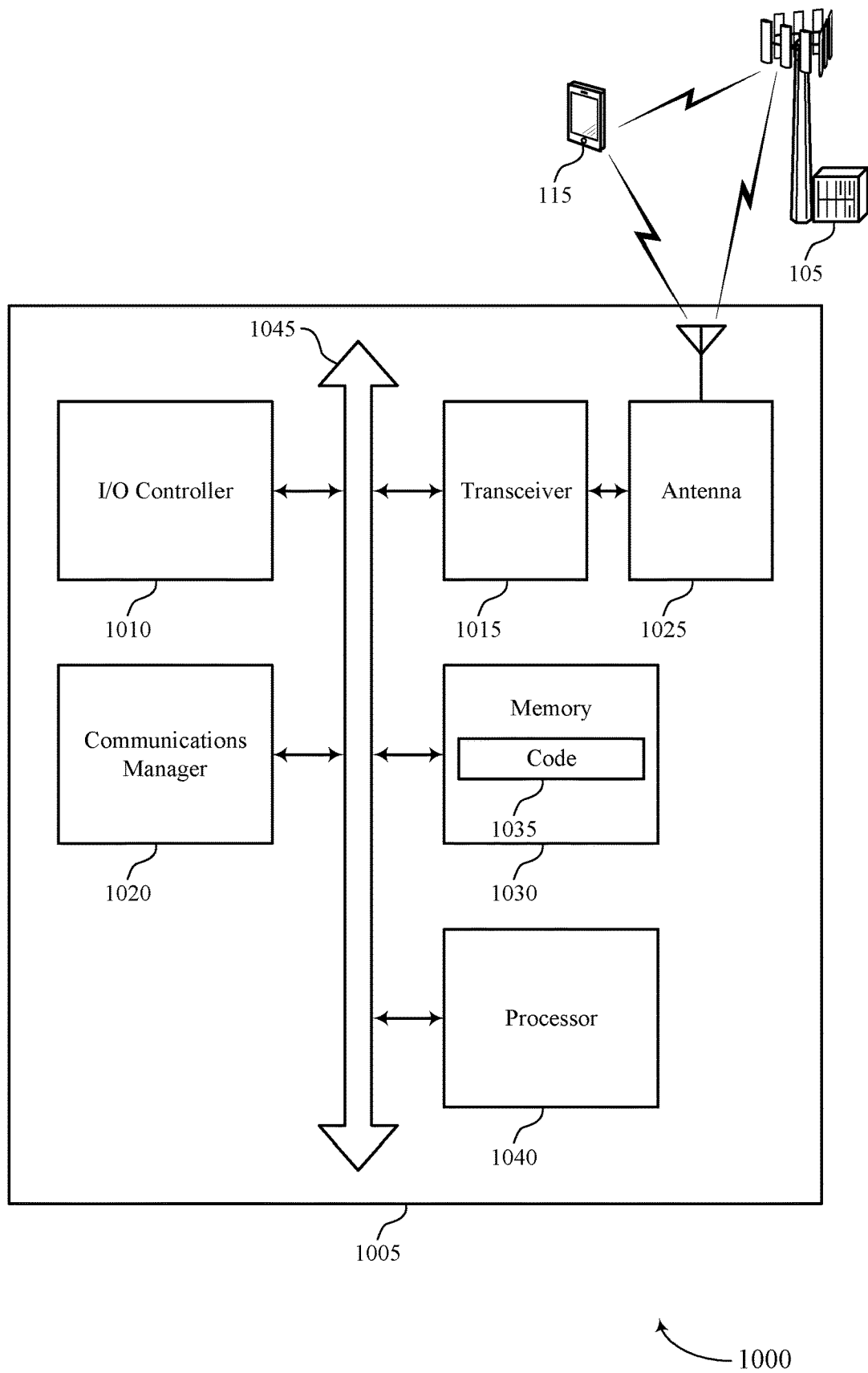
FIG. 10 shows a diagram of a system including a device that supports techniques for channel measurements for multiple uplink carriers in carrier aggregation in accordance with one or more aspects of the present disclosure.

FIG. 10 shows a diagram of a system 1000 including a device 1005 that supports techniques for channel measurements for multiple uplink carriers in carrier aggregation in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for channel measurements for multiple uplink carriers in carrier aggregation). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving first configuration information for a first downlink carrier for downlink communications to the UE. The communications manager 1020 may be configured as or otherwise support a means for receiving second configuration information for at least a first uplink carrier and second uplink carrier for uplink communications from the UE, where a quantity of uplink carriers exceeds a quantity of downlink carriers. The communications manager 1020 may be configured as or otherwise support a means for receiving an indication of a reference resource of a measurement downlink carrier that is associated with the second uplink carrier, where the first uplink carrier and the second uplink carrier are associated with a same serving cell and the measurement downlink carrier is different than the first downlink carrier. The communications manager 1020 may be configured as or otherwise support a means for measuring one or more signals received via the reference resource of the measurement downlink carrier to determine one or more measured channel parameters associated with the second uplink carrier. The communications manager 1020 may be configured as or otherwise support a means for transmitting one or more uplink communications using the second uplink carrier, where one or more transmission parameters of the one or more uplink communications are based on the one or more measured channel parameters.

By including or configuring the communications manager 1020 in accordance with examples as described herein, the device 1005 may support techniques for channel measurements associated with SUL carriers, that may enhance communications efficiency and reliability for transmissions via a SUL carrier. Further, described techniques may allow for SUL carriers and non-SUL carriers to have different TCI states for communications via different TRPs, which may enhance coverage and scheduling flexibility for carrier aggregation configurations that use SUL carriers. Such techniques thus may provide more consistent and reliable transmissions via SUL carriers through use of suitable transmission parameters for communications using SUL carriers, which may thus enhance overall system reliability and capacity, and enhance user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for channel measurements for multiple uplink carriers in carrier aggregation as described herein, or the processor 1040 and the memory 1030 may be otherwise configured to perform or support such operations.

Figure 11:
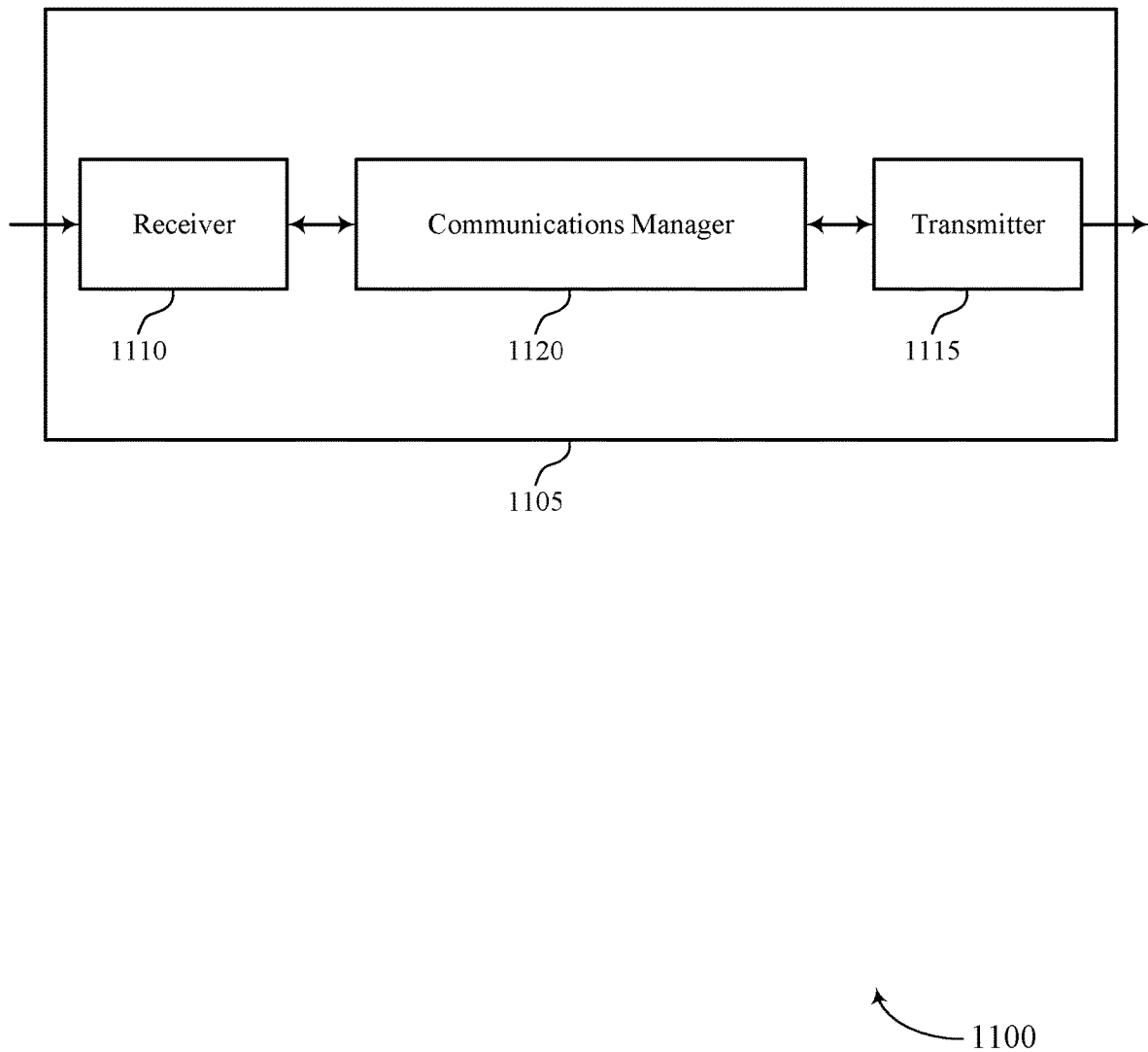
FIGS. 11 and 12 show block diagrams of devices that support techniques for channel measurements for multiple uplink carriers in carrier aggregation in accordance with one or more aspects of the present disclosure.

FIG. 11 shows a block diagram 1100 of a device 1105 that supports techniques for channel measurements for multiple uplink carriers in carrier aggregation in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of techniques for channel measurements for multiple uplink carriers in carrier aggregation as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. For example, the communications manager 1120 may be configured as or otherwise support a means for transmitting first configuration information to a UE for a first downlink carrier for downlink communications to the UE. The communications manager 1120 may be configured as or otherwise support a means for transmitting second configuration information to the UE for at least a first uplink carrier and second uplink carrier for uplink communications from the UE, where a quantity of uplink carriers exceeds a quantity of downlink carriers. The communications manager 1120 may be configured as or otherwise support a means for transmitting an indication of a reference resource of a measurement downlink carrier that is associated with the second uplink carrier, where the first uplink carrier and the second uplink carrier are associated with a same serving cell and the measurement downlink carrier is different than the first downlink carrier. The communications manager 1120 may be configured as or otherwise support a means for receiving one or more uplink communications via the second uplink carrier, where one or more transmission parameters of the one or more uplink communications are based on one or more measured channel parameters of one or more signals transmitted via the reference resource of the measurement downlink carrier.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for channel measurements associated with SUL carriers, that may enhance communications efficiency and reliability for transmissions via a SUL carrier. Further, described techniques may allow for SUL carriers and non-SUL carriers to have different TCI states for communications via different TRPs, which may enhance coverage and scheduling flexibility for carrier aggregation configurations that use SUL carriers. Such techniques thus may provide more consistent and reliable transmissions via SUL carriers through use of suitable transmission parameters for communications using SUL carriers, which may thus enhance overall system reliability and capacity, and enhance user experience.

Figure 12:
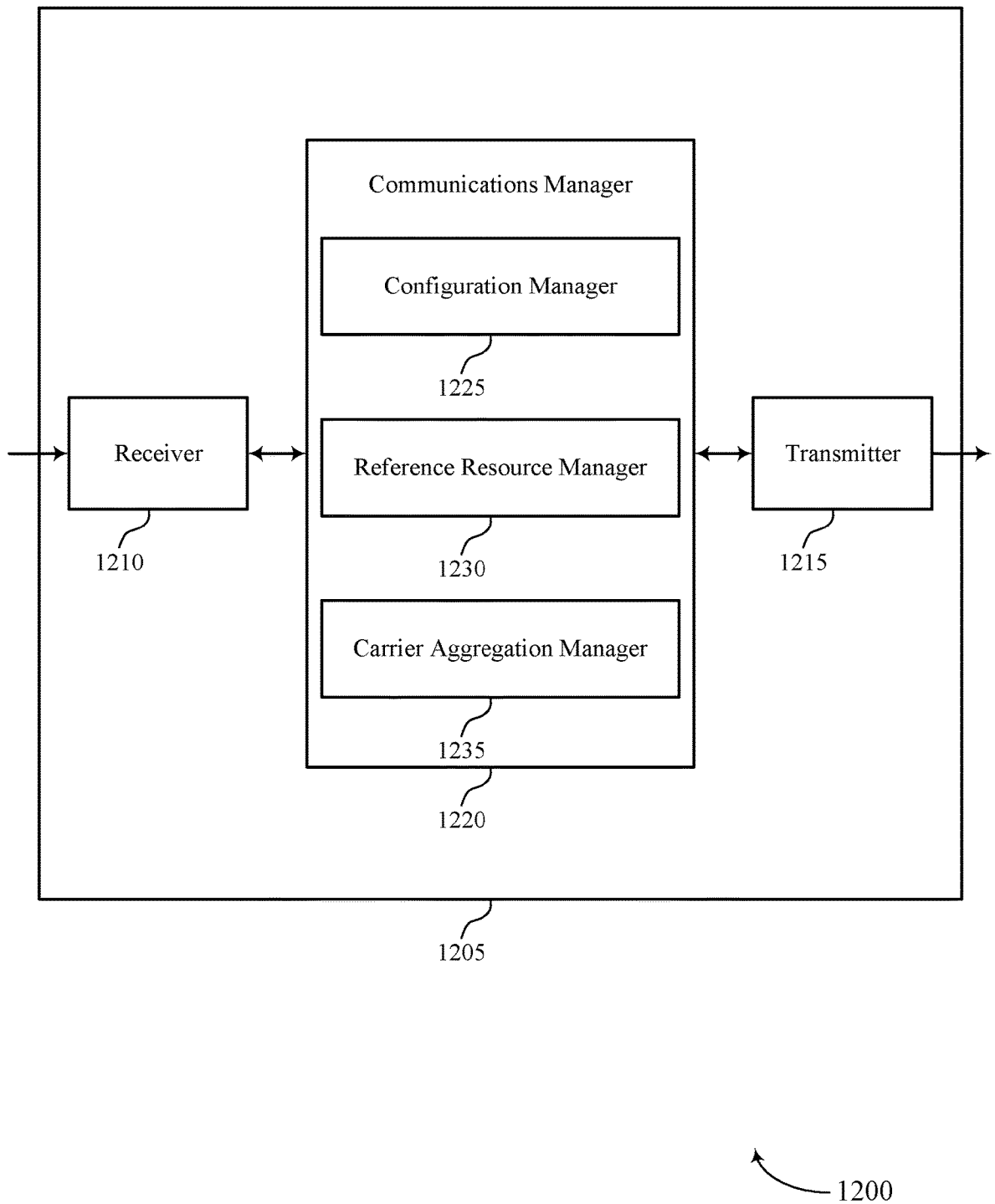

FIG. 12 shows a block diagram 1200 of a device 1205 that supports techniques for channel measurements for multiple uplink carriers in carrier aggregation in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for channel measurements for multiple uplink carriers in carrier aggregation as described herein. For example, the communications manager 1220 may include a configuration manager 1225, a reference resource manager 1230, a carrier aggregation manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. The configuration manager 1225 may be configured as or otherwise support a means for transmitting first configuration information to a UE for a first downlink carrier for downlink communications to the UE. The configuration manager 1225 may be configured as or otherwise support a means for transmitting second configuration information to the UE for at least a first uplink carrier and second uplink carrier for uplink communications from the UE, where a quantity of uplink carriers exceeds a quantity of downlink carriers. The reference resource manager 1230 may be configured as or otherwise support a means for transmitting an indication of a reference resource of a measurement downlink carrier that is associated with the second uplink carrier, where the first uplink carrier and the second uplink carrier are associated with a same serving cell and the measurement downlink carrier is different than the first downlink carrier. The carrier aggregation manager 1235 may be configured as or otherwise support a means for receiving one or more uplink communications via the second uplink carrier, where one or more transmission parameters of the one or more uplink communications are based on one or more measured channel parameters of one or more signals transmitted via the reference resource of the measurement downlink carrier.

Figure 13:
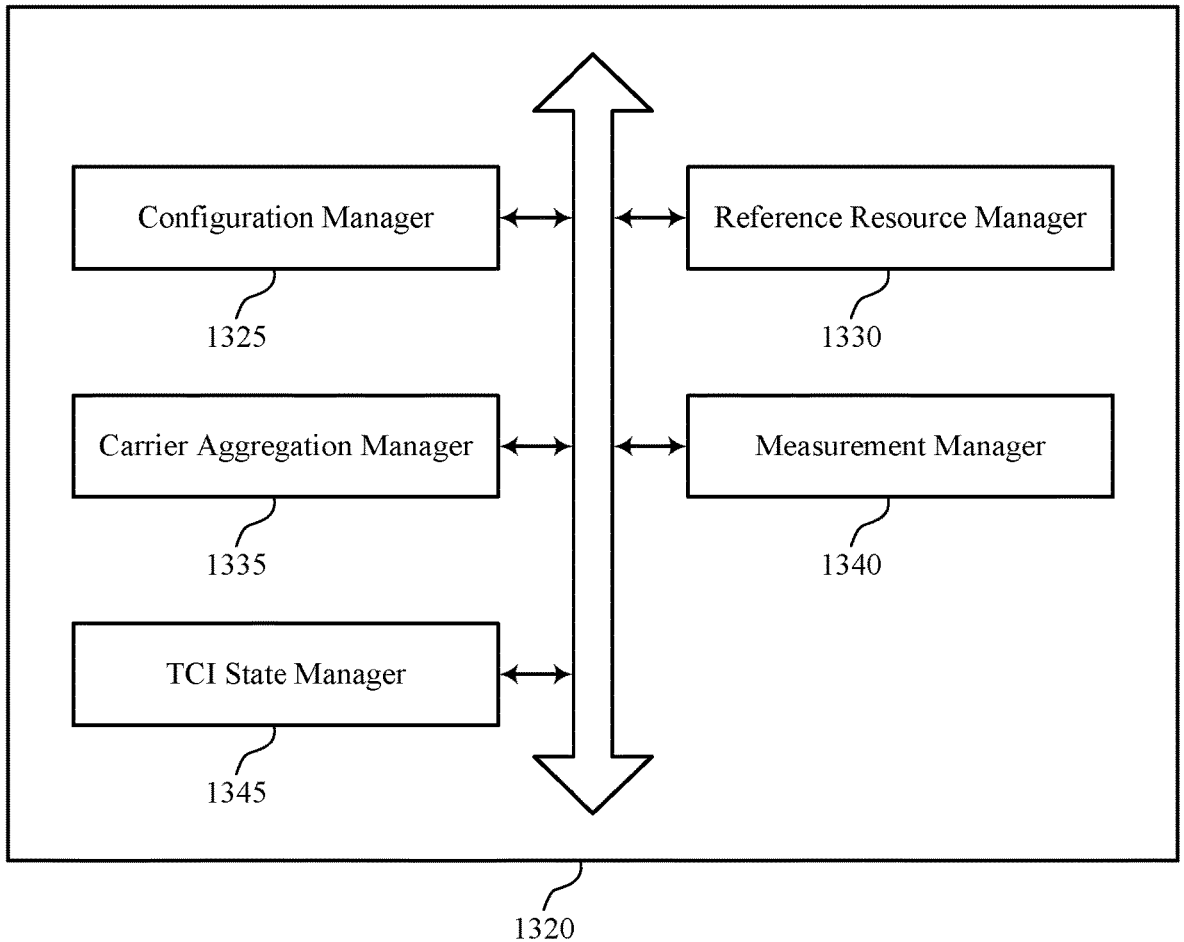
FIG. 13 shows a block diagram of a communications manager that supports techniques for channel measurements for multiple uplink carriers in carrier aggregation in accordance with one or more aspects of the present disclosure.

FIG. 13 shows a block diagram 1300 of a communications manager 1320 that supports techniques for channel measurements for multiple uplink carriers in carrier aggregation in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for channel measurements for multiple uplink carriers in carrier aggregation as described herein. For example, the communications manager 1320 may include a configuration manager 1325, a reference resource manager 1330, a carrier aggregation manager 1335, a measurement manager 1340, a TCI state manager 1345, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The configuration manager 1325 may be configured as or otherwise support a means for transmitting first configuration information to a UE for a first downlink carrier for downlink communications to the UE. In some examples, the configuration manager 1325 may be configured as or otherwise support a means for transmitting second configuration information to the UE for at least a first uplink carrier and second uplink carrier for uplink communications from the UE, where a quantity of uplink carriers exceeds a quantity of downlink carriers. The reference resource manager 1330 may be configured as or otherwise support a means for transmitting an indication of a reference resource of a measurement downlink carrier that is associated with the second uplink carrier, where the first uplink carrier and the second uplink carrier are associated with a same serving cell and the measurement downlink carrier is different than the first downlink carrier. The carrier aggregation manager 1335 may be configured as or otherwise support a means for receiving one or more uplink communications via the second uplink carrier, where one or more transmission parameters of the one or more uplink communications are based on one or more measured channel parameters of one or more signals transmitted via the reference resource of the measurement downlink carrier.

In some examples, the one or more signals transmitted via the reference resource of the measurement downlink carrier include one of more SSB transmissions, one or more TRS transmissions, one or more CSI-RS transmissions, or any combinations thereof. In some examples, the first uplink carrier and the first downlink carrier are in a first frequency band, and the second uplink carrier is in a second frequency band that is different than the first frequency band. In some examples, the measurement downlink carrier does not carry shared channel communications or control channel communications for the UE. In some examples, the first downlink carrier and the measurement downlink carrier are provided from different transmission-reception points.

In some examples, a first TCI state or beam measurement for the second uplink carrier is derived based on a first reference signal of two or more reference signals transmitted via the reference resource, and a second TCI state or beam measurement for the second uplink carrier is derived based on a second reference signal of the two or more reference signals. In some examples, a path loss estimation associated with the second uplink carrier is based on a first reference signal transmitted using the first downlink carrier, and a TCI state or beam measurement for the second uplink carrier is derived based on a second reference signal transmitted using the measurement downlink carrier.

In some examples, the configuration manager 1325 may be configured as or otherwise support a means for transmitting a control signal to the UE that indicates to enable the measuring of the one or more signals received via the reference resource of the measurement downlink carrier. In some examples, the configuration manager 1325 may be configured as or otherwise support a means for receiving, from the UE, a request to enable measurements on the reference resource, and where the control signal is transmitted responsive to the request.

Figure 14:
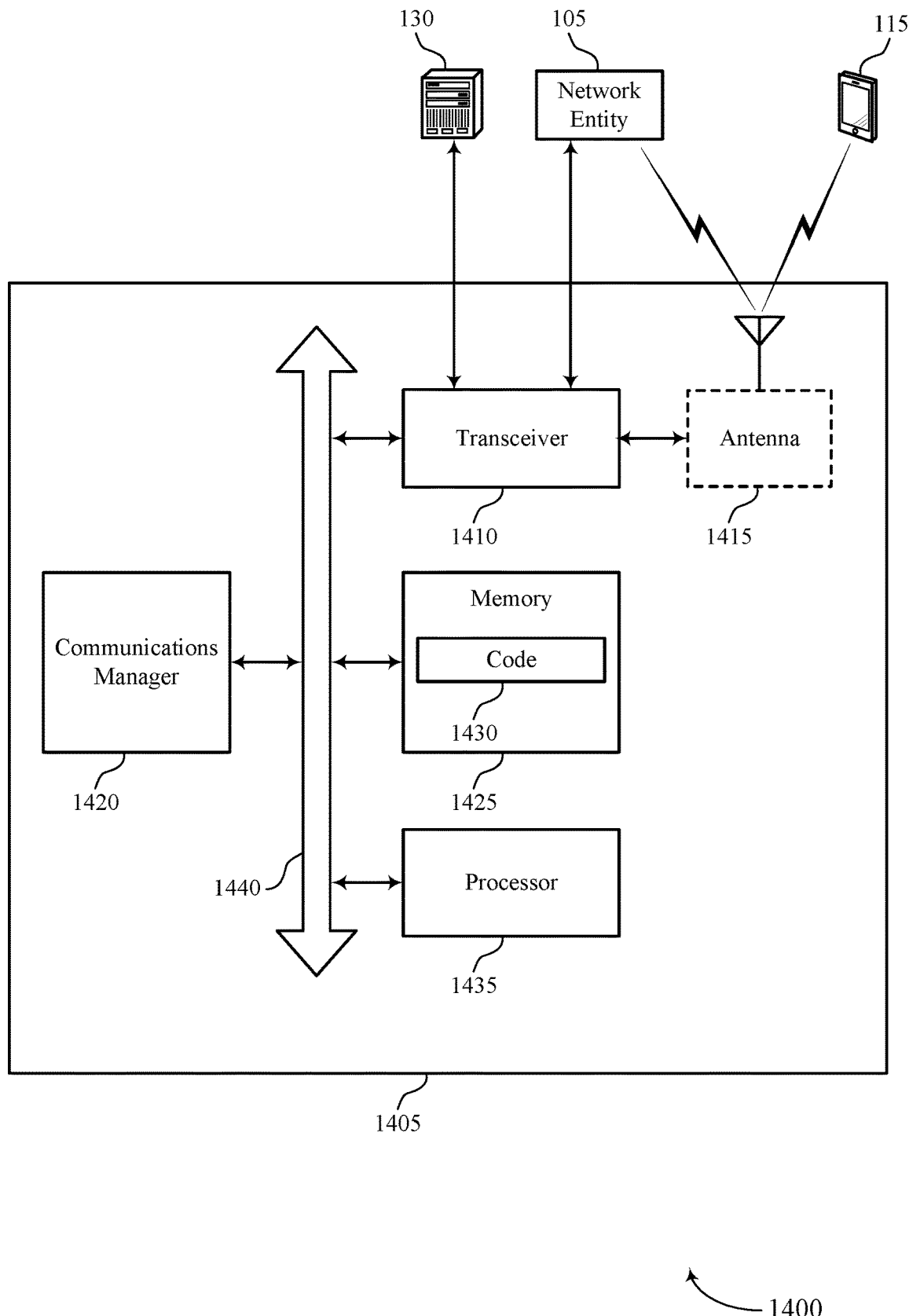
FIG. 14 shows a diagram of a system including a device that supports techniques for channel measurements for multiple uplink carriers in carrier aggregation in accordance with one or more aspects of the present disclosure.

FIG. 14 shows a diagram of a system 1400 including a device 1405 that supports techniques for channel measurements for multiple uplink carriers in carrier aggregation in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting techniques for channel measurements for multiple uplink carriers in carrier aggregation). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for transmitting first configuration information to a UE for a first downlink carrier for downlink communications to the UE. The communications manager 1420 may be configured as or otherwise support a means for transmitting second configuration information to the UE for at least a first uplink carrier and second uplink carrier for uplink communications from the UE, where a quantity of uplink carriers exceeds a quantity of downlink carriers. The communications manager 1420 may be configured as or otherwise support a means for transmitting an indication of a reference resource of a measurement downlink carrier that is associated with the second uplink carrier, where the first uplink carrier and the second uplink carrier are associated with a same serving cell and the measurement downlink carrier is different than the first downlink carrier. The communications manager 1420 may be configured as or otherwise support a means for receiving one or more uplink communications via the second uplink carrier, where one or more transmission parameters of the one or more uplink communications are based on one or more measured channel parameters of one or more signals transmitted via the reference resource of the measurement downlink carrier.

By including or configuring the communications manager 1420 in accordance with examples as described herein, the device 1405 may support techniques for channel measurements associated with SUL carriers, that may enhance communications efficiency and reliability for transmissions via a SUL carrier. Further, described techniques may allow for SUL carriers and non-SUL carriers to have different TCI states for communications via different TRPs, which may enhance coverage and scheduling flexibility for carrier aggregation configurations that use SUL carriers. Such techniques thus may provide more consistent and reliable transmissions via SUL carriers through use of suitable transmission parameters for communications using SUL carriers, which may thus enhance overall system reliability and capacity, and enhance user experience.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of techniques for channel measurements for multiple uplink carriers in carrier aggregation as described herein, or the processor 1435 and the memory 1425 may be otherwise configured to perform or support such operations.

Figure 15:
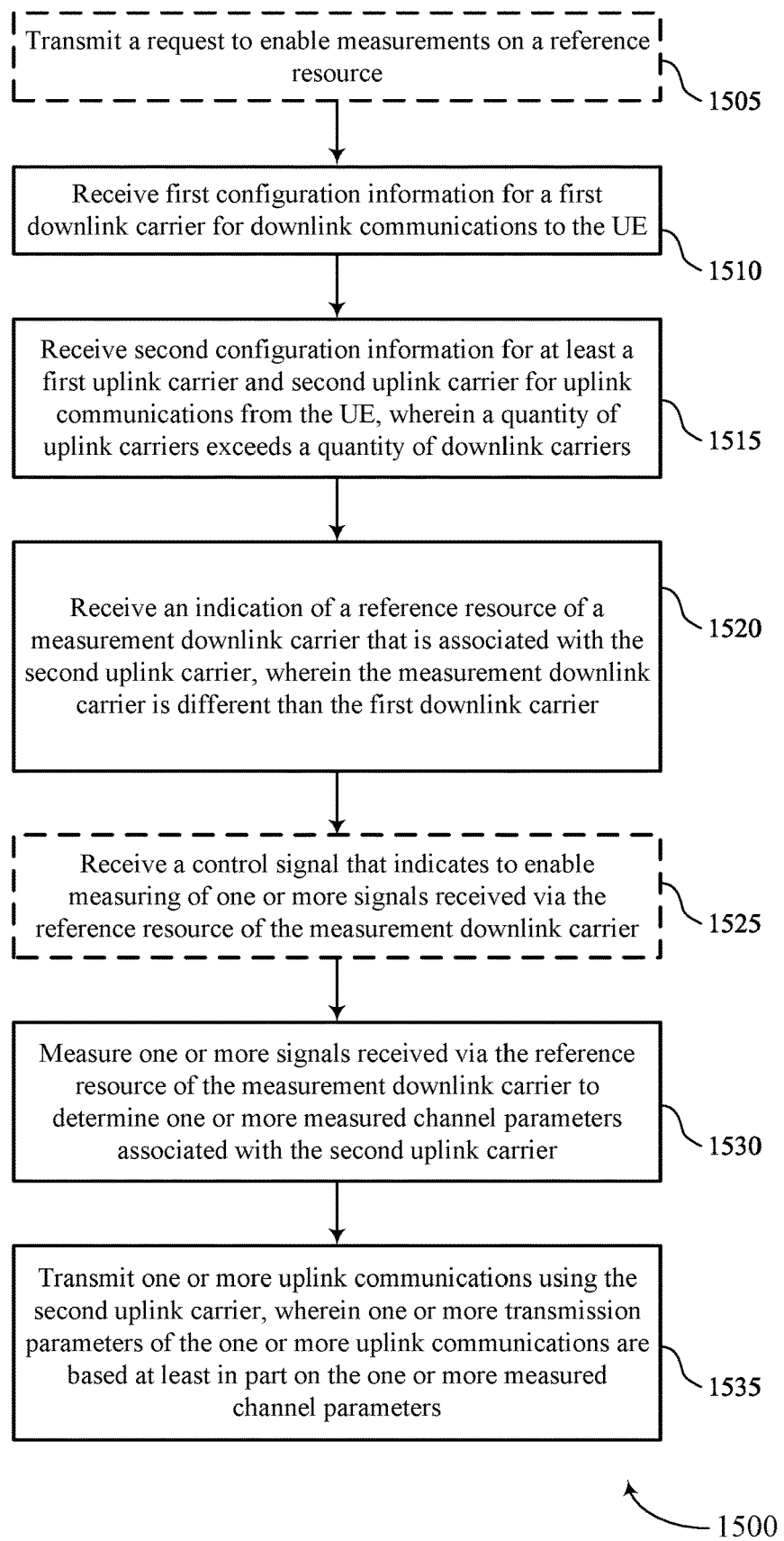
FIGS. 15 through 23 show flowcharts illustrating methods that support techniques for channel measurements for multiple uplink carriers in carrier aggregation in accordance with one or more aspects of the present disclosure.

FIG. 15 shows a flowchart illustrating a method 1500 that supports techniques for channel measurements for multiple uplink carriers in carrier aggregation in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, optionally, the method may include transmitting a request to enable measurements on a reference resource. The operations of 1505 may be performed in accordance with examples as disclosed herein. In some examples, aspects of the operations of 1505 may be performed by a configuration manager 925 as described with reference to FIG. 9.

At 1510, the method may include receiving first configuration information for a first downlink carrier for downlink communications to the UE. The operations of 1510 may be performed in accordance with examples as disclosed herein. In some examples, aspects of the operations of 1510 may be performed by a configuration manager 925 as described with reference to FIG. 9.

At 1515, the method may include receiving second configuration information for at least a first uplink carrier and second uplink carrier for uplink communications from the UE, where a quantity of uplink carriers exceeds a quantity of downlink carriers. The operations of 1515 may be performed in accordance with examples as disclosed herein. In some examples, aspects of the operations of 1515 may be performed by a configuration manager 925 as described with reference to FIG. 9.

At 1520, the method may include receiving an indication of a reference resource of a measurement downlink carrier that is associated with the second uplink carrier, where the measurement downlink carrier is different than the first downlink carrier. The operations of 1520 may be performed in accordance with examples as disclosed herein. In some examples, aspects of the operations of 1520 may be performed by a reference resource manager 930 as described with reference to FIG. 9. In some cases, the first uplink carrier and the second uplink carrier may be associated with a same serving cell.

At 1525, optionally, the method may include receiving a control signal that indicates to enable measuring of one or more signals received via the reference resource of the measurement downlink carrier. The operations of 1510 may be performed in accordance with examples as disclosed herein. In some examples, aspects of the operations of 1510 may be performed by a configuration manager 925 as described with reference to FIG. 9.

At 1530, the method may include measuring one or more signals received via the reference resource of the measurement downlink carrier to determine one or more measured channel parameters associated with the second uplink carrier. The operations of 1530 may be performed in accordance with examples as disclosed herein. In some examples, aspects of the operations of 1530 may be performed by a measurement manager 935 as described with reference to FIG. 9.

At 1535, the method may include transmitting one or more uplink communications using the second uplink carrier, where one or more transmission parameters of the one or more uplink communications are based on the one or more measured channel parameters. The operations of 1535 may be performed in accordance with examples as disclosed herein. In some examples, aspects of the operations of 1535 may be performed by a carrier aggregation manager 940 as described with reference to FIG. 9.

Figure 16:
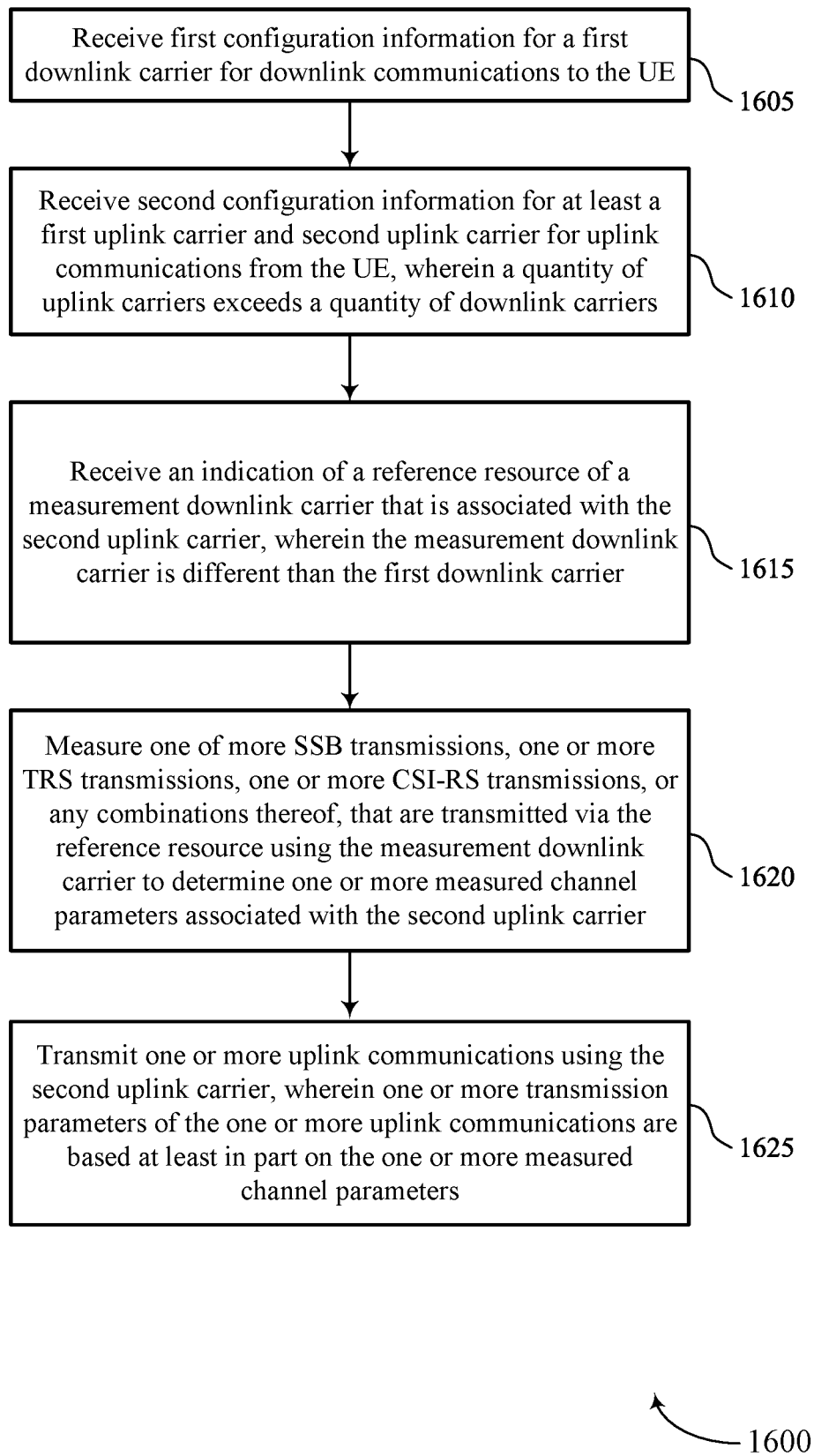

FIG. 16 shows a flowchart illustrating a method 1600 that supports techniques for channel measurements for multiple uplink carriers in carrier aggregation in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving first configuration information for a first downlink carrier for downlink communications to the UE. The operations of 1605 may be performed in accordance with examples as disclosed herein. In some examples, aspects of the operations of 1605 may be performed by a configuration manager 925 as described with reference to FIG. 9.

At 1610, the method may include receiving second configuration information for at least a first uplink carrier and second uplink carrier for uplink communications from the UE, where a quantity of uplink carriers exceeds a quantity of downlink carriers. The operations of 1610 may be performed in accordance with examples as disclosed herein. In some examples, aspects of the operations of 1610 may be performed by a configuration manager 925 as described with reference to FIG. 9.

At 1615, the method may include receiving an indication of a reference resource of a measurement downlink carrier that is associated with the second uplink carrier, where the measurement downlink carrier is different than the first downlink carrier. The operations of 1615 may be performed in accordance with examples as disclosed herein. In some examples, aspects of the operations of 1615 may be performed by a reference resource manager 930 as described with reference to FIG. 9.

At 1620, the method may include measuring one of more SSB transmissions, one or more TRS transmissions, one or more CSI-RS transmissions, or any combinations thereof, that are transmitted via the reference resource using the measurement downlink carrier to determine one or more measured channel parameters associated with the second uplink carrier. The operations of 1620 may be performed in accordance with examples as disclosed herein. In some examples, aspects of the operations of 1620 may be performed by a measurement manager 935 as described with reference to FIG. 9.

At 1625, the method may include measuring one or more signals received via the reference resource of the measurement downlink carrier to determine one or more measured channel parameters associated with the second uplink carrier. The operations of 1625 may be performed in accordance with examples as disclosed herein. In some examples, aspects of the operations of 1625 may be performed by a measurement manager 935 as described with reference to FIG. 9.

At 1630, the method may include transmitting one or more uplink communications using the second uplink carrier, where one or more transmission parameters of the one or more uplink communications are based on the one or more measured channel parameters. The operations of 1630 may be performed in accordance with examples as disclosed herein. In some examples, aspects of the operations of 1630 may be performed by a carrier aggregation manager 940 as described with reference to FIG. 9.

Figure 17:
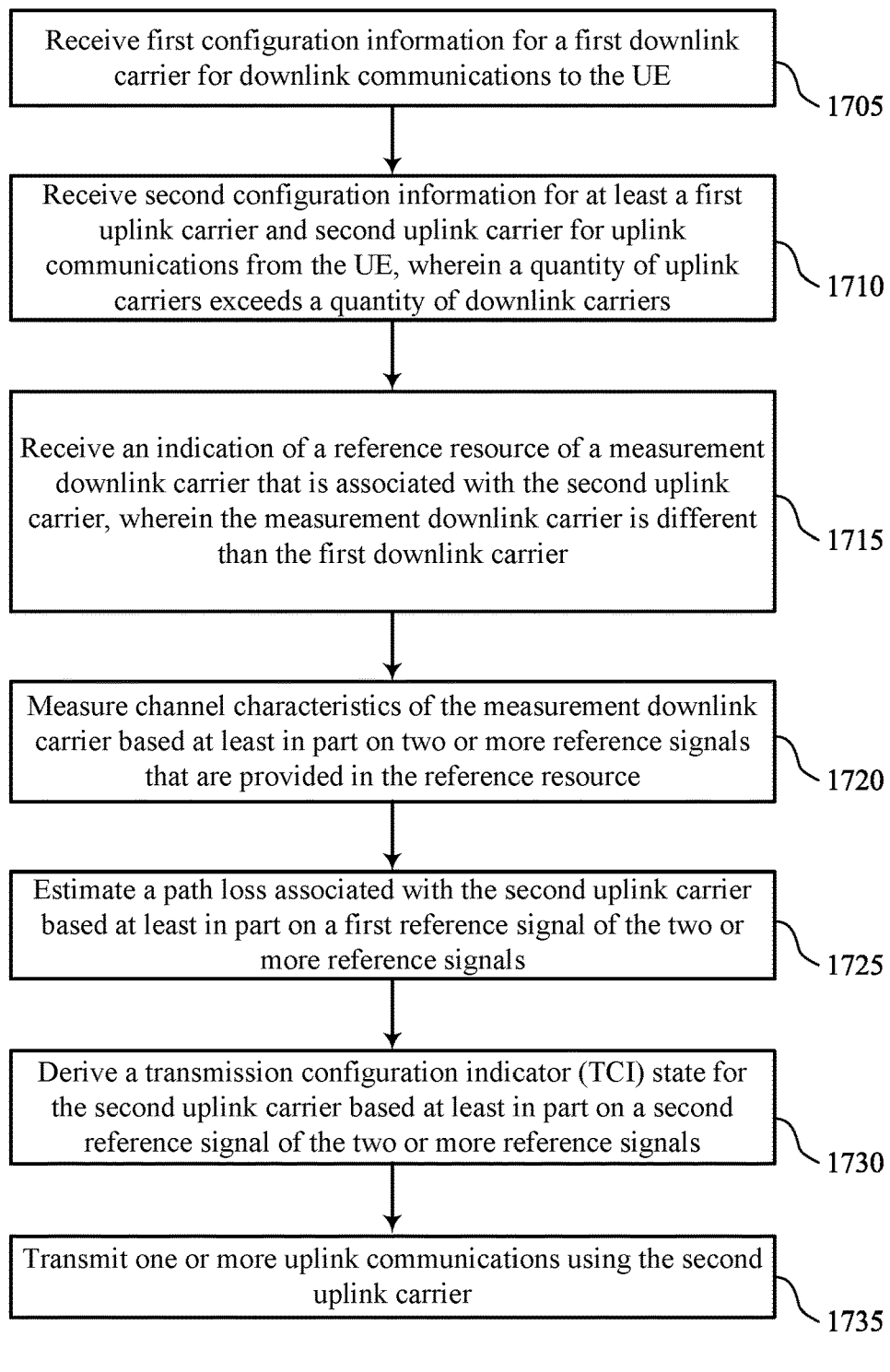

FIG. 17 shows a flowchart illustrating a method 1700 that supports techniques for channel measurements for multiple uplink carriers in carrier aggregation in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving first configuration information for a first downlink carrier for downlink communications to the UE. The operations of 1705 may be performed in accordance with examples as disclosed herein. In some examples, aspects of the operations of 1705 may be performed by a configuration manager 925 as described with reference to FIG. 9.

At 1710, the method may include receiving second configuration information for at least a first uplink carrier and second uplink carrier for uplink communications from the UE, where a quantity of uplink carriers exceeds a quantity of downlink carriers. The operations of 1710 may be performed in accordance with examples as disclosed herein. In some examples, aspects of the operations of 1710 may be performed by a configuration manager 925 as described with reference to FIG. 9.

At 1715, the method may include receiving an indication of a reference resource of a measurement downlink carrier that is associated with the second uplink carrier, where the measurement downlink carrier is different than the first downlink carrier. The operations of 1715 may be performed in accordance with examples as disclosed herein. In some examples, aspects of the operations of 1715 may be performed by a reference resource manager 930 as described with reference to FIG. 9.

At 1720, the method may include measuring channel characteristics of the measurement downlink carrier based on two or more reference signals that are provided in the reference resource. The operations of 1720 may be performed in accordance with examples as disclosed herein. In some examples, aspects of the operations of 1720 may be performed by a measurement manager 935 as described with reference to FIG. 9.

At 1725, the method may include estimating a path loss associated with the second uplink carrier based on a first reference signal of the two or more reference signals. The operations of 1725 may be performed in accordance with examples as disclosed herein. In some examples, aspects of the operations of 1725 may be performed by a TCI state manager 945 as described with reference to FIG. 9.

At 1730, the method may include deriving a TCI state or beam measurement for the second uplink carrier based on a second reference signal of the two or more reference signals. The operations of 1730 may be performed in accordance with examples as disclosed herein. In some examples, aspects of the operations of 1730 may be performed by a TCI state manager 945 as described with reference to FIG. 9.

At 1735, the method may include transmitting one or more uplink communications using the second uplink carrier. The operations of 1735 may be performed in accordance with examples as disclosed herein. In some examples, aspects of the operations of 1735 may be performed by a carrier aggregation manager 940 as described with reference to FIG. 9.

Figure 18:
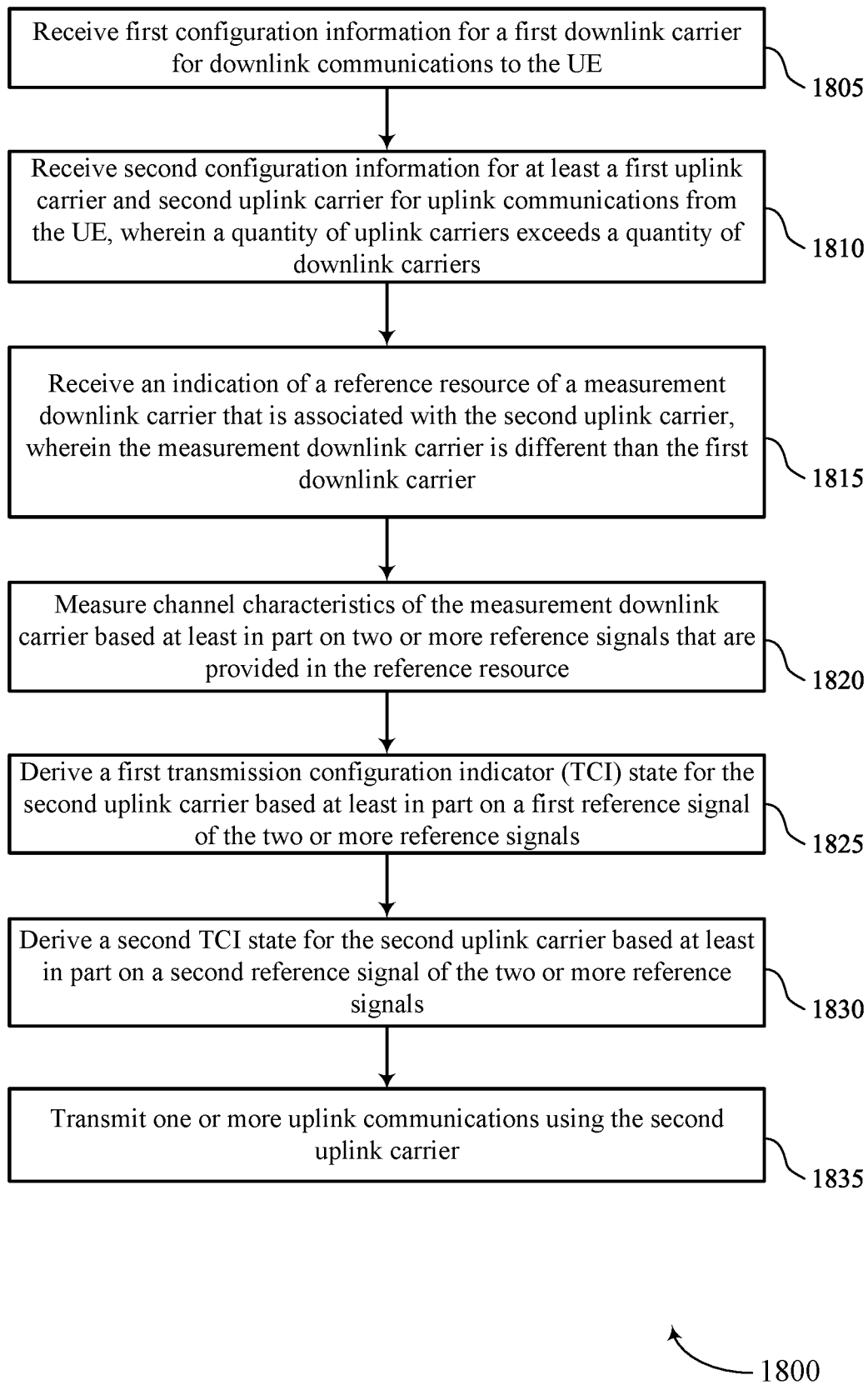

FIG. 18 shows a flowchart illustrating a method 1800 that supports techniques for channel measurements for multiple uplink carriers in carrier aggregation in accordance with one or more aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1805, the method may include receiving first configuration information for a first downlink carrier for downlink communications to the UE. The operations of 1805 may be performed in accordance with examples as disclosed herein. In some examples, aspects of the operations of 1805 may be performed by a configuration manager 925 as described with reference to FIG. 9.

At 1810, the method may include receiving second configuration information for at least a first uplink carrier and second uplink carrier for uplink communications from the UE, where a quantity of uplink carriers exceeds a quantity of downlink carriers. The operations of 1810 may be performed in accordance with examples as disclosed herein. In some examples, aspects of the operations of 1810 may be performed by a configuration manager 925 as described with reference to FIG. 9.

At 1815, the method may include receiving an indication of a reference resource of a measurement downlink carrier that is associated with the second uplink carrier, where the measurement downlink carrier is different than the first downlink carrier. The operations of 1815 may be performed in accordance with examples as disclosed herein. In some examples, aspects of the operations of 1815 may be performed by a reference resource manager 930 as described with reference to FIG. 9.

At 1820, the method may include measuring channel characteristics of the measurement downlink carrier based on two or more reference signals that are provided in the reference resource. The operations of 1820 may be performed in accordance with examples as disclosed herein. In some examples, aspects of the operations of 1820 may be performed by a measurement manager 935 as described with reference to FIG. 9.

At 1825, the method may include deriving a first TCI state or beam measurement for the second uplink carrier based on a first reference signal of the two or more reference signals. The operations of 1825 may be performed in accordance with examples as disclosed herein. In some examples, aspects of the operations of 1825 may be performed by a TCI state manager 945 as described with reference to FIG. 9.

At 1830, the method may include deriving a second TCI state or beam measurement for the second uplink carrier based on a second reference signal of the two or more reference signals. The operations of 1830 may be performed in accordance with examples as disclosed herein. In some examples, aspects of the operations of 1830 may be performed by a TCI state manager 945 as described with reference to FIG. 9.

At 1835, the method may include transmitting one or more uplink communications using the second uplink carrier. The operations of 1835 may be performed in accordance with examples as disclosed herein. In some examples, aspects of the operations of 1835 may be performed by a carrier aggregation manager 940 as described with reference to FIG. 9.

Figure 19:
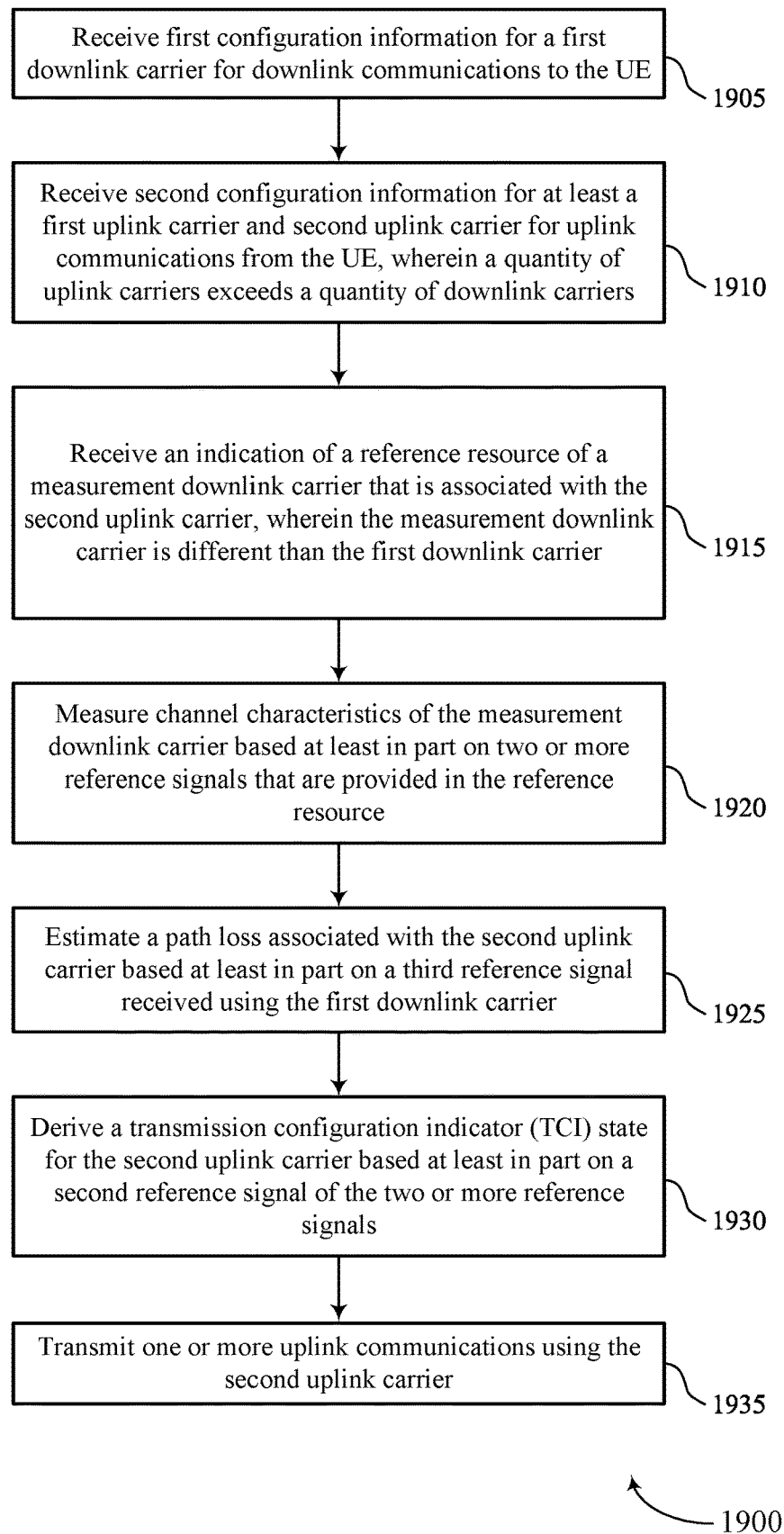

FIG. 19 shows a flowchart illustrating a method 1900 that supports techniques for channel measurements for multiple uplink carriers in carrier aggregation in accordance with one or more aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1905, the method may include receiving first configuration information for a first downlink carrier for downlink communications to the UE. The operations of 1905 may be performed in accordance with examples as disclosed herein. In some examples, aspects of the operations of 1905 may be performed by a configuration manager 925 as described with reference to FIG. 9.

At 1910, the method may include receiving second configuration information for at least a first uplink carrier and second uplink carrier for uplink communications from the UE, where a quantity of uplink carriers exceeds a quantity of downlink carriers. The operations of 1910 may be performed in accordance with examples as disclosed herein. In some examples, aspects of the operations of 1910 may be performed by a configuration manager 925 as described with reference to FIG. 9.

At 1915, the method may include receiving an indication of a reference resource of a measurement downlink carrier that is associated with the second uplink carrier, where the measurement downlink carrier is different than the first downlink carrier. The operations of 1915 may be performed in accordance with examples as disclosed herein. In some examples, aspects of the operations of 1915 may be performed by a reference resource manager 930 as described with reference to FIG. 9.

At 1920, the method may include measuring channel characteristics of the measurement downlink carrier based on two or more reference signals that are provided in the reference resource. The operations of 1920 may be performed in accordance with examples as disclosed herein. In some examples, aspects of the operations of 1920 may be performed by a measurement manager 935 as described with reference to FIG. 9.

At 1925, the method may include estimating a path loss associated with the second uplink carrier based on a third reference signal received using the first downlink carrier. The operations of 1925 may be performed in accordance with examples as disclosed herein. In some examples, aspects of the operations of 1925 may be performed by a TCI state manager 945 as described with reference to FIG. 9.

At 1930, the method may include deriving a TCI state or beam measurement for the second uplink carrier based on a second reference signal of the two or more reference signals. The operations of 1930 may be performed in accordance with examples as disclosed herein. In some examples, aspects of the operations of 1930 may be performed by a TCI state manager 945 as described with reference to FIG. 9.

At 1935, the method may include transmitting one or more uplink communications using the second uplink carrier, where one or more transmission parameters of the one or more uplink communications are based on the one or more measured channel parameters. The operations of 1935 may be performed in accordance with examples as disclosed herein. In some examples, aspects of the operations of 1935 may be performed by a carrier aggregation manager 940 as described with reference to FIG. 9.

Figure 20:
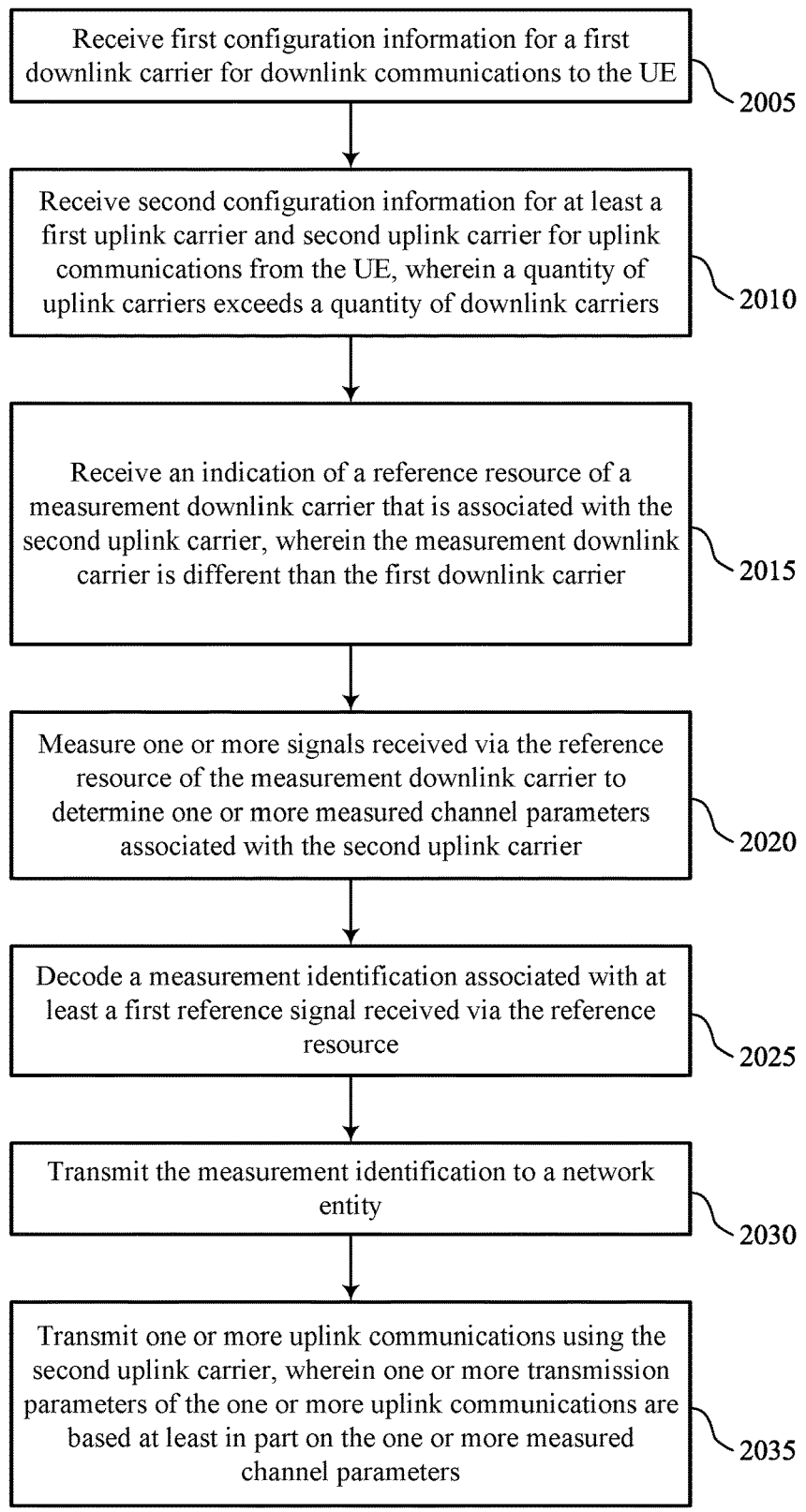

FIG. 20 shows a flowchart illustrating a method 2000 that supports techniques for channel measurements for multiple uplink carriers in carrier aggregation in accordance with one or more aspects of the present disclosure. The operations of the method 2000 may be implemented by a UE or its components as described herein. For example, the operations of the method 2000 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 2005, the method may include receiving first configuration information for a first downlink carrier for downlink communications to the UE. The operations of 2005 may be performed in accordance with examples as disclosed herein. In some examples, aspects of the operations of 2005 may be performed by a configuration manager 925 as described with reference to FIG. 9.

At 2010, the method may include receiving second configuration information for at least a first uplink carrier and second uplink carrier for uplink communications from the UE, where a quantity of uplink carriers exceeds a quantity of downlink carriers. The operations of 2010 may be performed in accordance with examples as disclosed herein. In some examples, aspects of the operations of 2010 may be performed by a configuration manager 925 as described with reference to FIG. 9.

At 2015, the method may include receiving an indication of a reference resource of a measurement downlink carrier that is associated with the second uplink carrier, where the measurement downlink carrier is different than the first downlink carrier. The operations of 2015 may be performed in accordance with examples as disclosed herein. In some examples, aspects of the operations of 2015 may be performed by a reference resource manager 930 as described with reference to FIG. 9.

At 2020, the method may include measuring one or more signals received via the reference resource of the measurement downlink carrier to determine one or more measured channel parameters associated with the second uplink carrier. The operations of 2020 may be performed in accordance with examples as disclosed herein. In some examples, aspects of the operations of 2020 may be performed by a measurement manager 935 as described with reference to FIG. 9.

At 2025, the method may include decoding a measurement identification associated with at least a first reference signal received via the reference resource. The operations of 2025 may be performed in accordance with examples as disclosed herein. In some examples, aspects of the operations of 2025 may be performed by a measurement manager 935 as described with reference to FIG. 9.

At 2030, the method may include transmitting the measurement identification to a network entity. The operations of 2030 may be performed in accordance with examples as disclosed herein. In some examples, aspects of the operations of 2030 may be performed by a measurement manager 935 as described with reference to FIG. 9.

At 2035, the method may include transmitting one or more uplink communications using the second uplink carrier, where one or more transmission parameters of the one or more uplink communications are based on the one or more measured channel parameters. The operations of 2035 may be performed in accordance with examples as disclosed herein. In some examples, aspects of the operations of 2035 may be performed by a carrier aggregation manager 940 as described with reference to FIG. 9.

Figure 21:
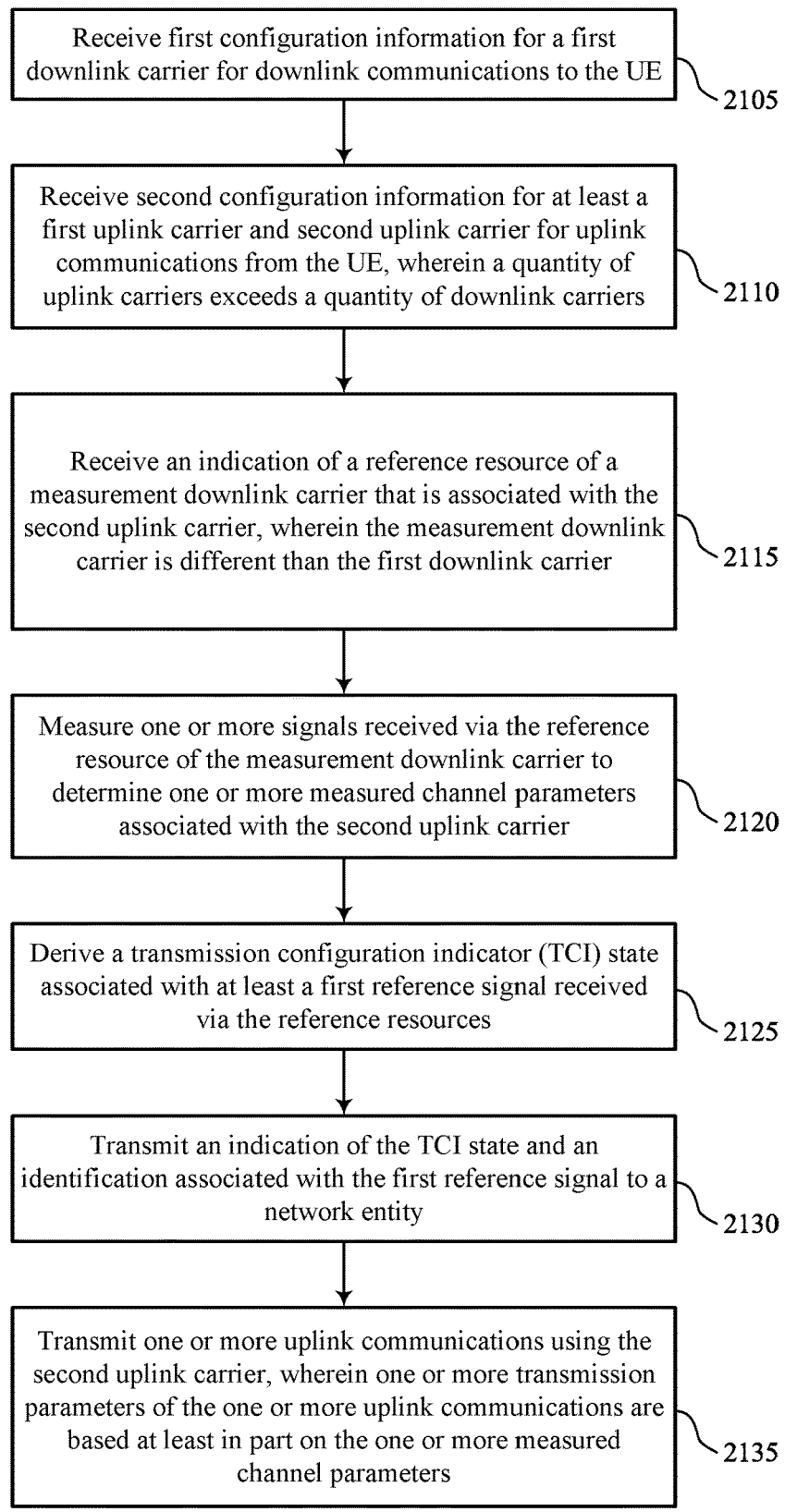

FIG. 21 shows a flowchart illustrating a method 2100 that supports techniques for channel measurements for multiple uplink carriers in carrier aggregation in accordance with one or more aspects of the present disclosure. The operations of the method 2100 may be implemented by a UE or its components as described herein. For example, the operations of the method 2100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 2105, the method may include receiving first configuration information for a first downlink carrier for downlink communications to the UE. The operations of 2105 may be performed in accordance with examples as disclosed herein. In some examples, aspects of the operations of 2105 may be performed by a configuration manager 925 as described with reference to FIG. 9.

At 2110, the method may include receiving second configuration information for at least a first uplink carrier and second uplink carrier for uplink communications from the UE, where a quantity of uplink carriers exceeds a quantity of downlink carriers. The operations of 2110 may be performed in accordance with examples as disclosed herein. In some examples, aspects of the operations of 2110 may be performed by a configuration manager 925 as described with reference to FIG. 9.

At 2115, the method may include receiving an indication of a reference resource of a measurement downlink carrier that is associated with the second uplink carrier, where the measurement downlink carrier is different than the first downlink carrier. The operations of 2115 may be performed in accordance with examples as disclosed herein. In some examples, aspects of the operations of 2115 may be performed by a reference resource manager 930 as described with reference to FIG. 9.

At 2120, the method may include measuring one or more signals received via the reference resource of the measurement downlink carrier to determine one or more measured channel parameters associated with the second uplink carrier. The operations of 2120 may be performed in accordance with examples as disclosed herein. In some examples, aspects of the operations of 2120 may be performed by a measurement manager 935 as described with reference to FIG. 9.

At 2125, the method may include deriving a TCI state or beam measurement associated with at least a first reference signal received via the reference resources. The operations of 2125 may be performed in accordance with examples as disclosed herein. In some examples, aspects of the operations of 2125 may be performed by a TCI state manager 945 as described with reference to FIG. 9.

At 2130, the method may include transmitting an indication of the TCI state or beam measurement and an identification associated with the first reference signal to a network entity. The operations of 2130 may be performed in accordance with examples as disclosed herein. In some examples, aspects of the operations of 2130 may be performed by a TCI state manager 945 as described with reference to FIG. 9.

At 2135, the method may include transmitting one or more uplink communications using the second uplink carrier, where one or more transmission parameters of the one or more uplink communications are based on the one or more measured channel parameters. The operations of 2135 may be performed in accordance with examples as disclosed herein. In some examples, aspects of the operations of 2135 may be performed by a carrier aggregation manager 940 as described with reference to FIG. 9.

Figure 22:
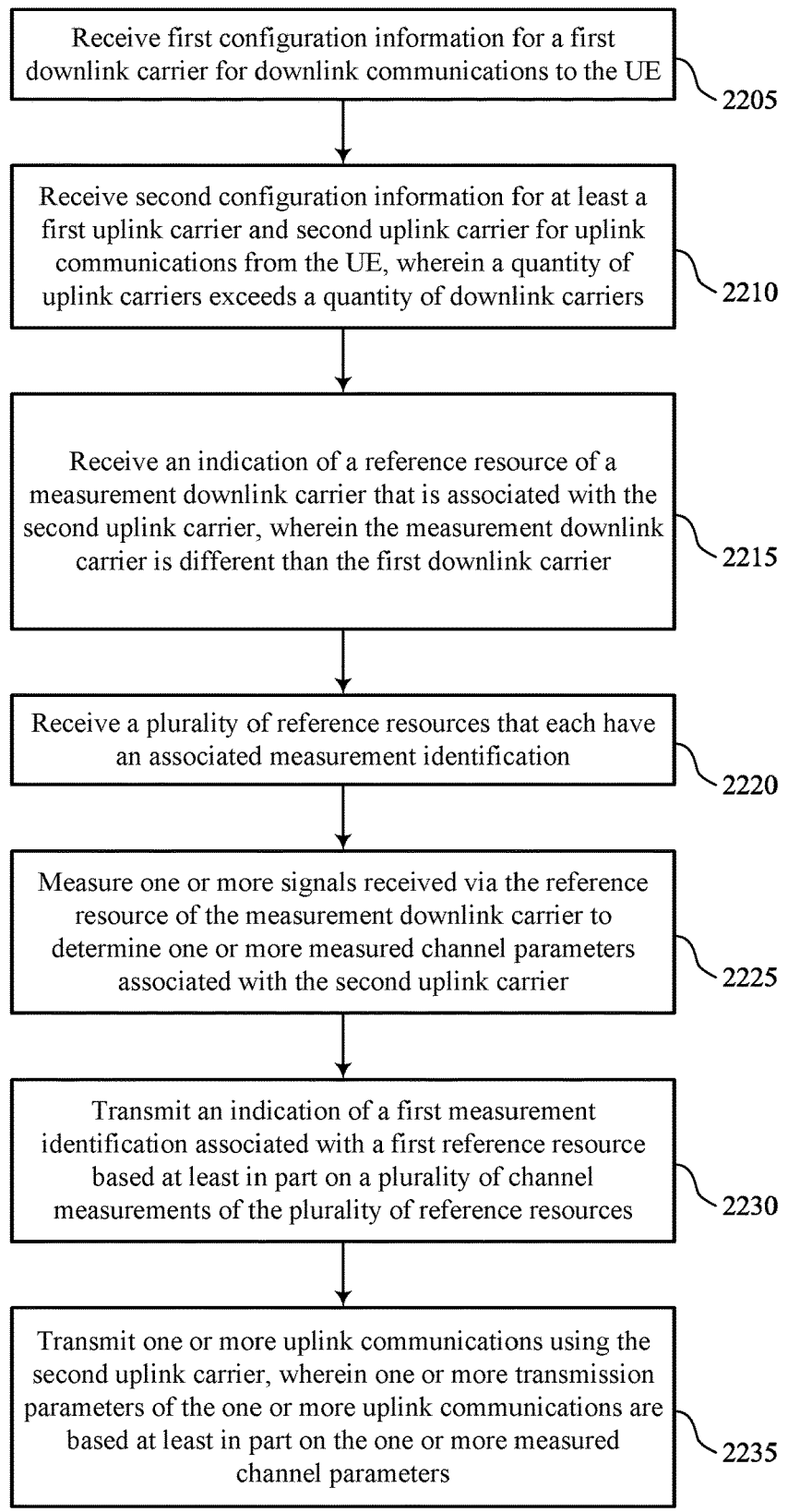

FIG. 22 shows a flowchart illustrating a method 2200 that supports techniques for channel measurements for multiple uplink carriers in carrier aggregation in accordance with one or more aspects of the present disclosure. The operations of the method 2200 may be implemented by a UE or its components as described herein. For example, the operations of the method 2200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 2205, the method may include receiving first configuration information for a first downlink carrier for downlink communications to the UE. The operations of 2205 may be performed in accordance with examples as disclosed herein. In some examples, aspects of the operations of 2205 may be performed by a configuration manager 925 as described with reference to FIG. 9.

At 2210, the method may include receiving second configuration information for at least a first uplink carrier and second uplink carrier for uplink communications from the UE, where a quantity of uplink carriers exceeds a quantity of downlink carriers. The operations of 2210 may be performed in accordance with examples as disclosed herein. In some examples, aspects of the operations of 2210 may be performed by a configuration manager 925 as described with reference to FIG. 9.

At 2215, the method may include receiving an indication of a reference resource of a measurement downlink carrier that is associated with the second uplink carrier, where the measurement downlink carrier is different than the first downlink carrier. The operations of 2215 may be performed in accordance with examples as disclosed herein. In some examples, aspects of the operations of 2215 may be performed by a reference resource manager 930 as described with reference to FIG. 9.

At 2220, the method may include receiving a set of multiple reference resources that each have an associated measurement identification. The operations of 2220 may be performed in accordance with examples as disclosed herein. In some examples, aspects of the operations of 2220 may be performed by a reference resource manager 930 as described with reference to FIG. 9.

At 2225, the method may include measuring one or more signals received via the reference resource of the measurement downlink carrier to determine one or more measured channel parameters associated with the second uplink carrier. The operations of 2225 may be performed in accordance with examples as disclosed herein. In some examples, aspects of the operations of 2225 may be performed by a measurement manager 935 as described with reference to FIG. 9.

At 2230, the method may include transmitting an indication of a first measurement identification associated with a first reference resource based on a set of multiple channel measurements of the set of multiple reference resources. The operations of 2230 may be performed in accordance with examples as disclosed herein. In some examples, aspects of the operations of 2230 may be performed by a reference resource manager 930 as described with reference to FIG. 9.

At 2235, the method may include transmitting one or more uplink communications using the second uplink carrier, where one or more transmission parameters of the one or more uplink communications are based on the one or more measured channel parameters. The operations of 2235 may be performed in accordance with examples as disclosed herein. In some examples, aspects of the operations of 2235 may be performed by a carrier aggregation manager 940 as described with reference to FIG. 9.

Figure 23:
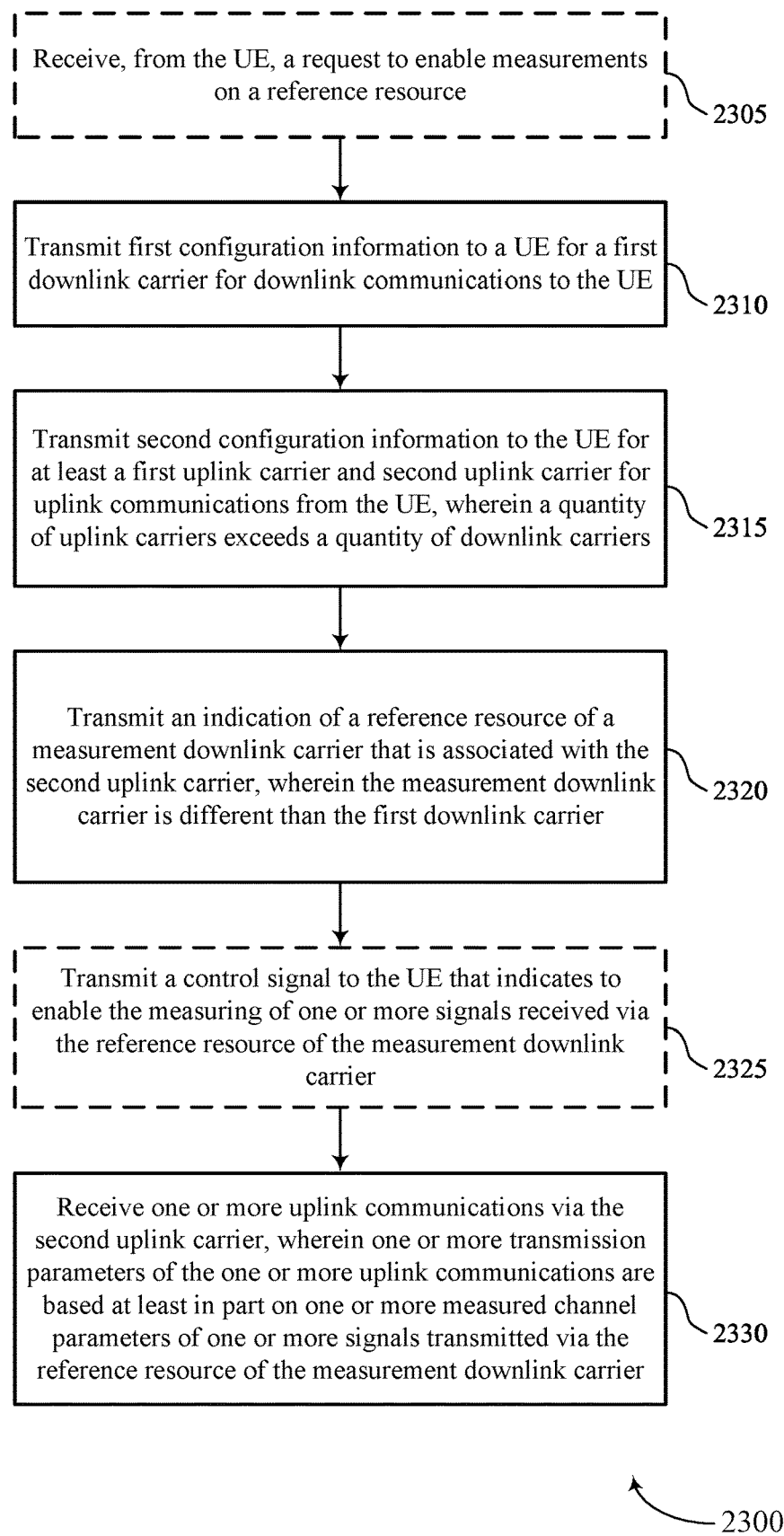

FIG. 23 shows a flowchart illustrating a method 2300 that supports techniques for channel measurements for multiple uplink carriers in carrier aggregation in accordance with one or more aspects of the present disclosure. The operations of the method 2300 may be implemented by a network entity or its components as described herein. For example, the operations of the method 2300 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2305, the method may include receiving, from the UE, a request to enable measurements on the reference resource, and where the control signal is transmitted responsive to the request. The operations of 2305 may be performed in accordance with examples as disclosed herein. In some examples, aspects of the operations of 2305 may be performed by a configuration manager 1325 as described with reference to FIG. 13.

At 2310, the method may include transmitting first configuration information to a UE for a first downlink carrier for downlink communications to the UE. The operations of 2310 may be performed in accordance with examples as disclosed herein. In some examples, aspects of the operations of 2310 may be performed by a configuration manager 1325 as described with reference to FIG. 13.

At 2315, the method may include transmitting second configuration information to the UE for at least a first uplink carrier and second uplink carrier for uplink communications from the UE, where a quantity of uplink carriers exceeds a quantity of downlink carriers. The operations of 2315 may be performed in accordance with examples as disclosed herein. In some examples, aspects of the operations of 2315 may be performed by a configuration manager 1325 as described with reference to FIG. 13.

At 2320, the method may include transmitting an indication of a reference resource of a measurement downlink carrier that is associated with the second uplink carrier, where the measurement downlink carrier is different than the first downlink carrier. The operations of 2320 may be performed in accordance with examples as disclosed herein. In some examples, aspects of the operations of 2320 may be performed by a reference resource manager 1330 as described with reference to FIG. 13.

At 2325, optionally, the method may include transmitting a control signal to the UE that indicates to enable the measuring of the one or more signals received via the reference resource of the measurement downlink carrier. The operations of 2325 may be performed in accordance with examples as disclosed herein. In some examples, aspects of the operations of 2325 may be performed by a configuration manager 1325 as described with reference to FIG. 13.

At 2330, the method may include receiving one or more uplink communications via the second uplink carrier, where one or more transmission parameters of the one or more uplink communications are based on one or more measured channel parameters of one or more signals transmitted via the reference resource of the measurement downlink carrier. The operations of 2330 may be performed in accordance with examples as disclosed herein. In some examples, aspects of the operations of 2330 may be performed by a carrier aggregation manager 1335 as described with reference to FIG. 13.

The following provides an overview of aspects of the present disclosure:

Aspect 1: A method for wireless communication at a UE, comprising: receiving first configuration information for a first downlink carrier for downlink communications to the UE; receiving second configuration information for at least a first uplink carrier and second uplink carrier for uplink communications from the UE, wherein a quantity of uplink carriers exceeds a quantity of downlink carriers; receiving an indication of a reference resource of a measurement downlink carrier that is associated with the second uplink carrier, wherein the measurement downlink carrier is different than the first downlink carrier; measuring one or more signals received via the reference resource of the measurement downlink carrier to determine one or more measured channel parameters associated with the second uplink carrier; and transmitting one or more uplink communications using the second uplink carrier, wherein one or more transmission parameters of the one or more uplink communications are based at least in part on the one or more measured channel parameters.

Aspect 2: The method of aspect 1, wherein the measuring comprises: measuring one of more SSB transmissions, one or more TRS transmissions, one or more CSI-RS transmissions, or any combinations thereof, that are transmitted via the reference resource using the measurement downlink carrier.

Aspect 3: The method of any of aspects 1 through 2, wherein the first uplink carrier and the first downlink carrier are in a first frequency band, and the second uplink carrier is in a second frequency band that is different than the first frequency band.

Aspect 4: The method of any of aspects 1 through 3, wherein the measurement downlink carrier does not carry shared channel communications or control channel communications for the UE.

Aspect 5: The method of any of aspects 1 through 4, wherein the first downlink carrier and the measurement downlink carrier are provided from different transmission-reception points.

Aspect 6: The method of any of aspects 1 through 5, wherein the measuring comprises: measuring channel characteristics of the measurement downlink carrier based at least in part on two or more reference signals that are provided in the reference resource.

Aspect 7: The method of aspect 6, further comprising: estimating a path loss associated with the second uplink carrier based at least in part on a first reference signal of the two or more reference signals; and deriving a TCI state or beam measurement for the second uplink carrier based at least in part on a second reference signal of the two or more reference signals.

Aspect 8: The method of any of aspects 6 through 7, further comprising: deriving a first TCI state or beam measurement for the second uplink carrier based at least in part on a first reference signal of the two or more reference signals; and deriving a second TCI state or beam measurement for the second uplink carrier based at least in part on a second reference signal of the two or more reference signals.

Aspect 9: The method of any of aspects 6 through 8, further comprising: estimating a path loss associated with the second uplink carrier based at least in part on a third reference signal received using the first downlink carrier; and deriving a TCI state or beam measurement for the second uplink carrier based at least in part on a second reference signal of the two or more reference signals.

Aspect 10: The method of any of aspects 1 through 9, further comprising: receiving a control signal that indicates to enable the measuring of the one or more signals received via the reference resource of the measurement downlink carrier.

Aspect 11: The method of aspect 10, further comprising: transmitting a request to enable measurements on the reference resource, or a request disable measurements on the reference resource.

Aspect 12: The method of any of aspects 1 through 11, wherein the measurement downlink carrier has a different bandwidth or a different center frequency than the second uplink carrier.

Aspect 13: The method of any of aspects 1 through 12, further comprising: decoding a measurement identification associated with at least a first reference signal received via the reference resource; and transmitting the measurement identification to a network entity.

Aspect 14: The method of any of aspects 1 through 13, further comprising: deriving a TCI state or beam measurement associated with at least a first reference signal received via the reference resource; and transmitting an indication of the TCI state or beam measurement and an identification associated with the first reference signal to a network entity.

Aspect 15: The method of any of aspects 1 through 14, further comprising: receiving a plurality of reference resources that each have an associated measurement identification; and transmitting an indication of a first measurement identification associated with a first reference resource based at least in part on a plurality of channel measurements of the plurality of reference resources.

Aspect 16: A method for wireless communication at a network entity, comprising: transmitting first configuration information to a UE for a first downlink carrier for downlink communications to the UE; transmitting second configuration information to the UE for at least a first uplink carrier and second uplink carrier for uplink communications from the UE, wherein a quantity of uplink carriers exceeds a quantity of downlink carriers; transmitting an indication of a reference resource of a measurement downlink carrier that is associated with the second uplink carrier, wherein the measurement downlink carrier is different than the first downlink carrier; and receiving one or more uplink communications via the second uplink carrier, wherein one or more transmission parameters of the one or more uplink communications are based at least in part on one or more measured channel parameters of one or more signals transmitted via the reference resource of the measurement downlink carrier.

Aspect 17: The method of aspect 16, wherein the one or more signals transmitted via the reference resource of the measurement downlink carrier include one of more SSB transmissions, one or more TRS transmissions, one or more CSI-RS transmissions, or any combinations thereof.

Aspect 18: The method of any of aspects 16 through 17, wherein the first uplink carrier and the first downlink carrier are in a first frequency band, and the second uplink carrier is in a second frequency band that is different than the first frequency band.

Aspect 19: The method of any of aspects 16 through 18, wherein the measurement downlink carrier does not carry shared channel communications or control channel communications for the UE.

Aspect 20: The method of any of aspects 16 through 19, wherein the first downlink carrier and the measurement downlink carrier are provided from different transmission-reception points.

Aspect 21: The method of any of aspects 16 through 20, wherein a first TCI state or beam measurement for the second uplink carrier is derived based at least in part on a first reference signal of two or more reference signals transmitted via the reference resource, and a second TCI state or beam measurement for the second uplink carrier is derived based at least in part on a second reference signal of the two or more reference signals.

Aspect 22: The method of any of aspects 16 through 21, wherein a path loss estimation associated with the second uplink carrier is based at least in part on a first reference signal transmitted using the first downlink carrier, and a TCI state or beam measurement for the second uplink carrier is derived based at least in part on a second reference signal transmitted using the measurement downlink carrier.

Aspect 23: The method of any of aspects 16 through 22, further comprising: transmitting a control signal to the UE that indicates to enable the measuring of the one or more signals received via the reference resource of the measurement downlink carrier.

Aspect 24: The method of aspect 23, further comprising: receiving, from the UE, a request to enable measurements on the reference resource or a request disable measurements on the reference resource, and wherein the control signal is transmitted or not transmitted responsive to the request.

Aspect 25: An apparatus for wireless communication at a UE, comprising a processor; memory coupled with the processor; and instructions stored in the memory and executable by the processor to cause the apparatus to perform a method of any of aspects 1 through 15.

Aspect 26: An apparatus for wireless communication at a UE, comprising at least one means for performing a method of any of aspects 1 through 15.

Aspect 27: A non-transitory computer-readable medium storing code for wireless communication at a UE, the code comprising instructions executable by a processor to perform a method of any of aspects 1 through 15.

Aspect 28: An apparatus for wireless communication at a network entity, comprising a processor; memory coupled with the processor; and instructions stored in the memory and executable by the processor to cause the apparatus to perform a method of any of aspects 16 through 24.

Aspect 29: An apparatus for wireless communication at a network entity, comprising at least one means for performing a method of any of aspects 16 through 24.

Aspect 30: A non-transitory computer-readable medium storing code for wireless communication at a network entity, the code comprising instructions executable by a processor to perform a method of any of aspects 16 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving first configuration information for a first downlink carrier for downlink communications to the UE;
    receiving second configuration information for at least a first uplink carrier and second uplink carrier for uplink communications from the UE, wherein a quantity of uplink carriers exceeds a quantity of downlink carriers;
    receiving an indication of a reference resource of a measurement downlink carrier that is associated with the second uplink carrier, wherein the measurement downlink carrier is different than the first downlink carrier, wherein the measurement downlink carrier carries a reference signal that is exclusive of shared channel communications or control channel communications for the UE;
    measuring one or more signals received via the reference resource of the measurement downlink carrier to determine one or more measured channel parameters associated with the second uplink carrier; and
    transmitting one or more uplink communications using the second uplink carrier, wherein one or more transmission parameters of the one or more uplink communications are based at least in part on the one or more measured channel parameters.

2. The method of claim 1, wherein the measuring comprises:
    measuring one or more synchronization signal block (SSB) transmissions, one or more tracking reference signal (TRS) transmissions, one or more channel state information reference signal (CSI-RS) transmissions, or any combinations thereof, that are transmitted via the reference resource using the measurement downlink carrier.

3. The method of claim 1, wherein the first uplink carrier and the first downlink carrier are in a first frequency band, and the second uplink carrier is in a second frequency band that is different than the first frequency band.

4. The method of claim 1, wherein the first downlink carrier and the measurement downlink carrier are provided from different transmission-reception points.

5. The method of claim 1, wherein the measuring comprises:
    measuring channel characteristics of the measurement downlink carrier based at least in part on two or more reference signals that are provided in the reference resource.

6. The method of claim 5, further comprising:
    estimating a path loss associated with the second uplink carrier based at least in part on a first reference signal of the two or more reference signals; and
    deriving a transmission configuration indicator (TCI) state for the second uplink carrier based at least in part on a second reference signal of the two or more reference signals.

7. The method of claim 5, further comprising:
    deriving a first transmission configuration indicator (TCI) state or beam measurement for the second uplink carrier based at least in part on a first reference signal of the two or more reference signals; and
    deriving a second TCI state or beam measurement for the second uplink carrier based at least in part on a second reference signal of the two or more reference signals.

8. The method of claim 5, further comprising:
    estimating a path loss associated with the second uplink carrier based at least in part on a third reference signal received using the first downlink carrier; and
    deriving a transmission configuration indicator (TCI) state or beam measurement for the second uplink carrier based at least in part on a second reference signal of the two or more reference signals.

9. The method of claim 1, further comprising:
    receiving a control signal that indicates to enable the measuring of the one or more signals received via the reference resource of the measurement downlink carrier.

10. The method of claim 9, further comprising:
    transmitting a request to enable measurements on the reference resource, or a request disable measurements on the reference resource.

11. The method of claim 1, wherein the measurement downlink carrier has a different bandwidth or a different center frequency than the second uplink carrier.

12. The method of claim 1, further comprising:
    decoding a measurement identification associated with at least a first reference signal received via the reference resource; and transmitting the measurement identification to a network entity.

13. The method of claim 1, further comprising:
deriving a transmission configuration indicator (TCI) state or beam measurement associated with at least a first reference signal received via the reference resource; and
transmitting an indication of the TCI state or beam measurement and an identification associated with the first reference signal to a network entity.

14. The method of claim 1, further comprising:
receiving a plurality of reference resources that each have an associated measurement identification; and
transmitting an indication of a first measurement identification associated with a first reference resource based at least in part on a plurality of channel measurements of the plurality of reference resources.

15. A method for wireless communication at a network entity, comprising:
transmitting first configuration information to a user equipment (UE) for a first downlink carrier for downlink communications to the UE;
transmitting second configuration information to the UE for at least a first uplink carrier and second uplink carrier for uplink communications from the UE, wherein a quantity of uplink carriers exceeds a quantity of downlink carriers;
transmitting an indication of a reference resource of a measurement downlink carrier that is associated with the second uplink carrier, wherein the measurement downlink carrier is different than the first downlink carrier, wherein the measurement downlink carrier carries a reference signal that is exclusive of shared channel communications or control channel communications for the UE; and
receiving one or more uplink communications via the second uplink carrier, wherein one or more transmission parameters of the one or more uplink communications are based at least in part on one or more measured channel parameters of one or more signals transmitted via the reference resource of the measurement downlink carrier.

16. The method of claim 15, wherein the one or more signals transmitted via the reference resource of the measurement downlink carrier include one or more synchronization signal block (SSB) transmissions, one or more tracking reference signal (TRS) transmissions, one or more channel state information reference signal (CSI-RS) transmissions, or any combinations thereof.

17. The method of claim 15, wherein the first uplink carrier and the first downlink carrier are in a first frequency band, and the second uplink carrier is in a second frequency band that is different than the first frequency band.

18. The method of claim 15, wherein the first downlink carrier and the measurement downlink carrier are provided from different transmission-reception points.

19. The method of claim 15, wherein a first transmission configuration indicator (TCI) state or beam measurement for the second uplink carrier is derived based at least in part on a first reference signal of two or more reference signals transmitted via the reference resource, and a second TCI state or beam measurement for the second uplink carrier is derived based at least in part on a second reference signal of the two or more reference signals.

20. The method of claim 15, wherein a path loss estimation associated with the second uplink carrier is based at least in part on a first reference signal transmitted using the first downlink carrier, and a transmission configuration indicator (TCI) state or beam measurement for the second uplink carrier is derived based at least in part on a second reference signal transmitted using the measurement downlink carrier.

21. The method of claim 15, further comprising:
transmitting a control signal to the UE that indicates to enable the measuring of the one or more signals received via the reference resource of the measurement downlink carrier.

22. The method of claim 21, further comprising:
receiving, from the UE, a request to enable measurements on the reference resource or a request disable measurements on the reference resource, and wherein the control signal is transmitted or not transmitted responsive to the request.

23. An apparatus for wireless communication at a user equipment (UE), comprising:
one or more memories storing processor-executable code; and
one or more processors coupled with the one or more memories and individually or collectively operable to execute the code;
to cause the apparatus to:
receive first configuration information for a first downlink carrier for downlink communications to the UE;
receive second configuration information for at least a first uplink carrier and second uplink carrier for uplink communications from the UE, wherein a quantity of uplink carriers exceeds a quantity of downlink carriers;
receive an indication of a reference resource of a measurement downlink carrier that is associated with the second uplink carrier, wherein the measurement downlink carrier is different than the first downlink carrier, wherein the measurement downlink carrier carries a reference signal that is exclusive of shared channel communications or control channel communications for the UE;
measure one or more signals received via the reference resource of the measurement downlink carrier to determine one or more measured channel parameters associated with the second uplink carrier; and
transmit one or more uplink communications using the second uplink carrier, wherein one or more transmission parameters of the one or more uplink communications are based at least in part on the one or more measured channel parameters.

24. The apparatus of claim 23, wherein, to measure the one or more signals, the one or more processors are operable to cause the apparatus to:
measure channel characteristics of the measurement downlink carrier based at least in part on two or more reference signals that are provided in the reference resource.

25. The apparatus of claim 24, wherein the one or more processors are further operable to cause the apparatus to:
estimate a path loss associated with the second uplink carrier based at least in part on a third reference signal received using the first downlink carrier; and
derive a transmission configuration indicator (TCI) state or beam measurement for the second uplink carrier based at least in part on a second reference signal of the two or more reference signals.

26. An apparatus for wireless communication at a network entity, comprising:

one or more memories storing processor-executable code; and one or more processors coupled with the one or more memories and individually or collectively operable to execute the code;

to cause the apparatus to:

transmit first configuration information to a user equipment (UE) for a first downlink carrier for downlink communications to the UE;

transmit second configuration information to the UE for at least a first uplink carrier and second uplink carrier for uplink communications from the UE, wherein a quantity of uplink carriers exceeds a quantity of downlink carriers;

transmit an indication of a reference resource of a measurement downlink carrier that is associated with the second uplink carrier, wherein the measurement downlink carrier is different than the first downlink carrier, wherein the measurement downlink carrier carries a reference signal that is exclusive of shared channel communications or control channel communications for the UE; and receive one or more uplink communications via the second uplink carrier, wherein one or more transmission parameters of the one or more uplink communications are based at least in part on one or more measured channel parameters of one or more signals transmitted via the reference resource of the measurement downlink carrier.

27. The apparatus of claim 26, wherein the first uplink carrier and the first downlink carrier are in a first frequency band, and the second uplink carrier is in a second frequency band that is different than the first frequency band.

28. The apparatus of claim 26, wherein a first transmission configuration indicator (TCI) state or beam measurement for the second uplink carrier is derived based at least in part on a first reference signal of two or more reference signals transmitted via the reference resource, and a second TCI state or beam measurement for the second uplink carrier is derived based at least in part on a second reference signal of the two or more reference signals.

* * * * *